(12) United States Patent
So et al.

(10) Patent No.: US 12,702,259 B2
(45) Date of Patent: Aug. 11, 2026

(54) ROBOT FOR DETECTING FLOOR WHILE MOVING AND CONTROL METHOD THEREOF

(71) Applicant: Samsung Electronics Co., Ltd., Suwon-si (KR)

(72) Inventors: Jeayun So, Suwon-si (KR); Kyongsu Kim, Suwon-si (KR); Jinhee Kim, Suwon-si (KR); Yeonkyu Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 18/760,664

(22) Filed: Jul. 1, 2024

(65) Prior Publication Data

US 2025/0082156 A1 Mar. 13, 2025

Related U.S. Application Data

(63) Continuation of application No. PCT/KR2024/008696, filed on Jun. 24, 2024.

(30) Foreign Application Priority Data

Sep. 11, 2023 (KR) ........................ 10-2023-0120494

(51) Int. Cl.
*A47L 9/28* (2006.01)
*A47L 9/00* (2006.01)
(Continued)

(52) U.S. Cl.
CPC ............. *A47L 9/2826* (2013.01); *A47L 9/009* (2013.01); *A47L 9/2852* (2013.01);
(Continued)

(58) Field of Classification Search
CPC ...... A47L 9/2826; A47L 9/2894; A47L 9/009; A47L 9/2852; A47L 11/4011;
(Continued)

(56) References Cited

U.S. PATENT DOCUMENTS 6,741,054 B2 5/2004 Koselka et al.
7,249,570 B1 * 7/2007 Roberson ............ A01K 1/0157 119/169

(Continued)

FOREIGN PATENT DOCUMENTS

EP 1 972 192 A2 9/2008
EP 3 698 622 A1 8/2020

(Continued)

OTHER PUBLICATIONS

WO-2021010493-A1 with English translation; published Jan. 21, 2021; filed Jul. 12, 2019. (Year: 2021).*

(Continued)

*Primary Examiner* — Calvin Cheung
(74) *Attorney, Agent, or Firm* — Jefferson IP Law, LLP

(57) ABSTRACT

A cleaning robot for detecting a floor while moving around and a method of controlling the cleaning robot are provided. The method includes identifying, by the cleaning robot, a fibrous floor area through a floor detection sensor while the cleaning robot moves around on a cleaning area, determining, by the cleaning robot, based on at least one of a size of the fibrous floor area or a location of the fibrous floor area on a map of the cleaning area, whether the fibrous floor area is a defecation pad area, and causing, based on determining that the fibrous floor area is the defecation pad area, the cleaning robot to move around while avoiding the fibrous floor area.

18 Claims, 26 Drawing Sheets

(51) Int. Cl.

| | |
|---|---|
| ***A47L 11/40*** | (2006.01) |
| ***G05D 1/648*** | (2024.01) |
| *G05D 101/00* | (2024.01) |
| *G05D 105/10* | (2024.01) |

(52) U.S. Cl.

CPC ......... *A47L 9/2894* (2013.01); *A47L 11/4011* (2013.01); *A47L 11/4061* (2013.01); *G05D 1/6485* (2024.01); *A47L 2201/04* (2013.01); *G05D 2101/22* (2024.01); *G05D 2105/10* (2024.01)

(58) Field of Classification Search

CPC ............. A47L 11/4061; A47L 2201/04; G05D 2101/22; G05D 2105/10; G05D 1/6485

See application file for complete search history.

(56) References Cited

U.S. PATENT DOCUMENTS

| | | | |
|---|---|---|---|
| 8,346,389 | B2 | 1/2013 | Kim et al. |
| 9,220,389 | B2 | 12/2015 | Dooley et al. |
| 9,265,396 | B1 | 2/2016 | Lu et al. |
| 9,320,409 | B1 | 4/2016 | Lu et al. |
| 9,427,127 | B2 | 8/2016 | Dooley et al. |
| 9,615,712 | B2 | 4/2017 | Dooley et al. |
| 9,962,054 | B2 | 5/2018 | Seo et al. |
| 10,064,533 | B2 | 9/2018 | Lu et al. |
| 10,172,505 | B2 | 1/2019 | Tai et al. |
| 10,398,277 | B2 | 9/2019 | Dooley et al. |
| 10,499,783 | B2 | 12/2019 | Lu et al. |
| 10,595,698 | B2 | 3/2020 | Williams et al. |
| 10,730,397 | B2 | 8/2020 | Romanov et al. |
| 10,881,080 | B2 | 1/2021 | Komatsubara |
| 11,272,822 | B2 | 3/2022 | Dooley et al. |
| 11,317,601 | B2 | 5/2022 | Komatsubara |
| 11,412,704 | B2 | 8/2022 | Noh |
| 11,625,043 | B2 | 4/2023 | Yang et al. |
| 12,004,702 | B2 | 6/2024 | Choi et al. |
| 2018/0361585 | A1* | 12/2018 | Williams ................ A47L 11/14 |
| 2019/0313600 | A1 | 10/2019 | Komatsubara |
| 2021/0011476 | A1* | 1/2021 | Ban ...................... G05D 1/0246 |
| 2021/0228050 | A1 | 7/2021 | Zhang et al. |
| 2022/0280009 | A1* | 9/2022 | Tan ..................... A47L 11/4066 |
| 2023/0053480 | A1 | 2/2023 | Lee et al. |
| 2023/0249352 | A1 | 8/2023 | Kim |

FOREIGN PATENT DOCUMENTS

| | | | |
|---|---|---|---|
| JP | 2021-180872 | A | 11/2021 |
| KR | 10-2234642 | B1 | 4/2021 |
| KR | 10-2281346 | B1 | 7/2021 |
| KR | 10-2021-0125974 | A | 10/2021 |
| KR | 10-2022-0074001 | A | 6/2022 |
| WO | 2017/195383 | A1 | 11/2017 |

OTHER PUBLICATIONS

JP-2015070922-A with English translation; published Apr. 16, 2015; filed Oct. 2, 2013. (Year: 2015).*

International Search Report with Written Opinion dated Sep. 27, 2024; International Appln. No. PCT/KR2024/008696.

* cited by examiner

FIG. 6A

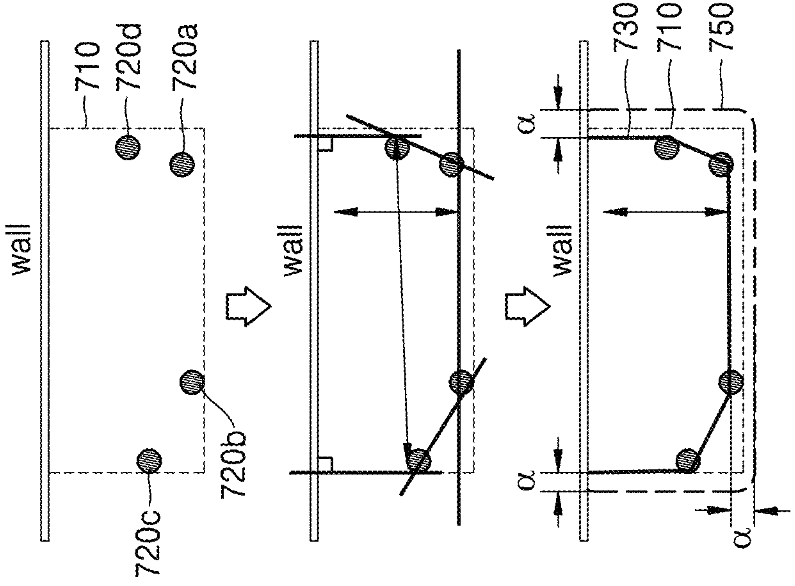
FIG. 7A
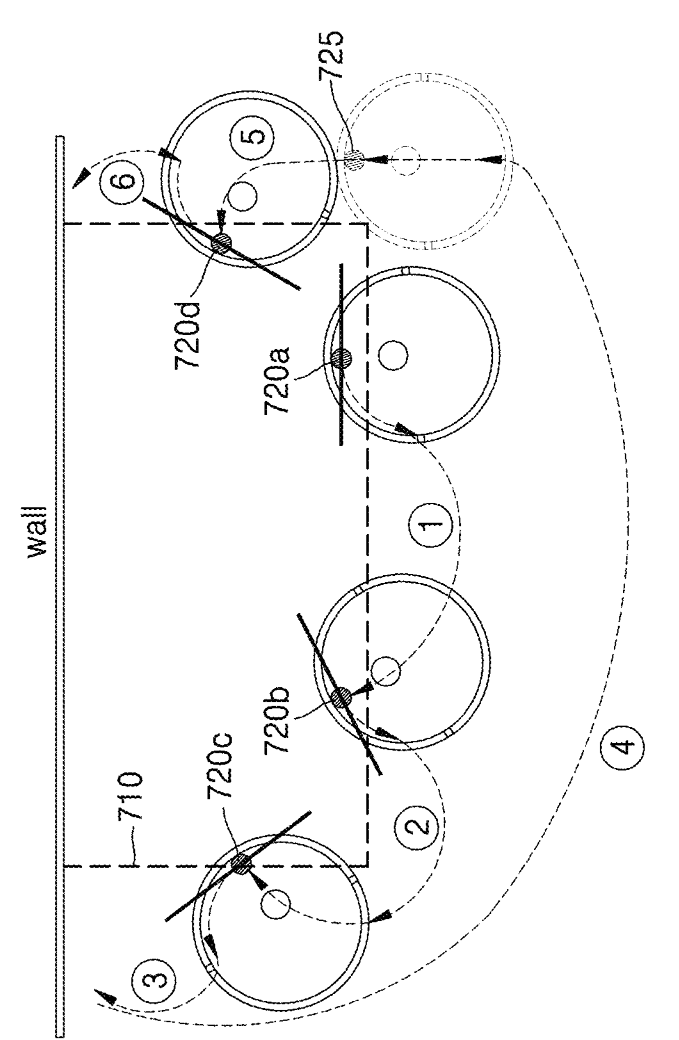

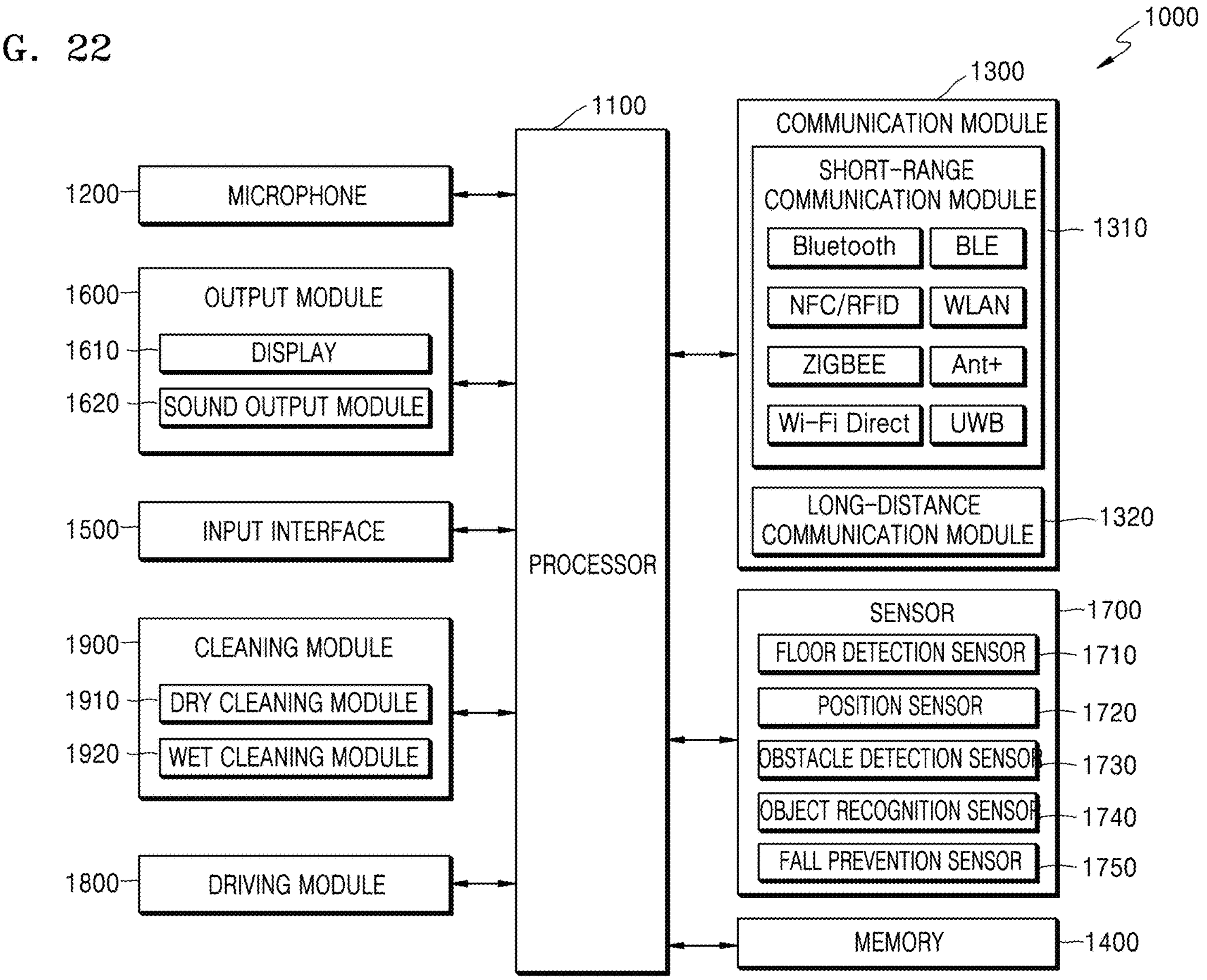
FIG. 22
1000
1100
1300
COMMUNICATION MODULE
SHORT-RANGE COMMUNICATION MODULE
1310
Bluetooth
BLE
NFC/RFID
WLAN
ZIGBEE
Ant+
Wi-Fi Direct
UWB
LONG-DISTANCE COMMUNICATION MODULE
1320
1200
MICROPHONE
1600
OUTPUT MODULE
1610
DISPLAY
1620
SOUND OUTPUT MODULE
1500
INPUT INTERFACE
PROCESSOR
1900
CLEANING MODULE
1910
DRY CLEANING MODULE
1920
WET CLEANING MODULE
1800
DRIVING MODULE
SENSOR
1700
FLOOR DETECTION SENSOR
1710
POSITION SENSOR
1720
OBSTACLE DETECTION SENSOR
1730
OBJECT RECOGNITION SENSOR
1740
FALL PREVENTION SENSOR
1750
MEMORY
1400

ROBOT FOR DETECTING FLOOR WHILE MOVING AND CONTROL METHOD THEREOF

CROSS-REFERENCE TO RELATED APPLICATION(S)

This application is a continuation application, claiming priority under § 365 (c), of an International application No. PCT/KR2024/008696, filed on Jun. 24, 2024, which is based on and claims the benefit of a Korean patent application number 10-2023-0120494, filed on Sep. 11, 2023, in the Korean Intellectual Property Office, the disclosure of which is incorporated by reference herein in its entirety.

TECHNICAL FIELD

The disclosure relates to a robot for detecting a floor while moving around, a robot control method, and a computer-readable recording medium having recorded thereon a computer program for performing the robot control method.

BACKGROUND ART

With the development of cleaning robots, more functions are provided by such cleaning robots. For example, the cleaning robots may move around while performing various cleaning functions according to users' settings. Also, the cleaning robots recognize home appliances or furniture through object recognition and perform cleaning operations suitable for the recognized home appliances or furniture. Also, the cleaning robots can prevent falls by using fall prevention sensors. Also, the cleaning robots detect carpets and increase suction power when moving on the carpets.

However, there may be areas where it is desirable for cleaning robots not to enter, among cleaning areas. For example, when a cleaning robot passes over a defecation pad laid on a cleaning area, there is a risk that the pet's excrement on the defecation pad will be sucked into the cleaning robot or spread to the surrounding area.

The above information is presented as background information only to assist with an understanding of the disclosure. No determination has been made, and no assertion is made, as to whether any of the above might be applicable as prior art with regard to the disclosure.

DISCLOSURE

Aspects of the disclosure are to address at least the above-mentioned problems and/or disadvantages and to provide at least the advantages described below. Accordingly, an aspect of the disclosure is to provide a robot for detecting a floor while moving around, a robot control method, and a computer-readable recording medium having recorded thereon a computer program for performing the robot control method.

Additional aspects will be set forth in part in the description which follows and, in part, will be apparent from the description, or may be learned by practice of the presented embodiments.

Technical Solution

In accordance with an aspect of the disclosure, a cleaning robot for detecting a floor while moving around is provided. The cleaning robot includes a driving circuit, a floor detection sensor, memory storing one or more computer programs, and one or more processors communicatively coupled to the driving circuit, the floor detection sensor, and the memory, wherein the one or more computer programs include computer-executable instructions that, when executed by the one or more processors individually or collectively, cause the cleaning robot to identify a fibrous floor area through the floor detection sensor while the cleaning robot moves around on a cleaning area, determine whether the fibrous floor area is a defecation pad area based on at least one of a size of the fibrous floor area or a location of the fibrous floor area on a map of the cleaning area, and control, based on identification that the fibrous floor area is the defecation pad area, the driving circuit to cause the cleaning robot to move around while avoiding the fibrous floor area.

In accordance with another aspect of the disclosure, a method performed by a cleaning robot for detecting a floor while moving around is provided. The method includes identifying, by the cleaning robot, a fibrous floor area while the cleaning robot moves around on a cleaning area, determining, by the cleaning robot, based on at least one of a size of the fibrous floor area or a location of the fibrous floor area on a map of the cleaning area, whether the fibrous floor area is a defecation pad area, and causing, by the cleaning robot, based on identification that the fibrous floor area is the defecation pad area, the cleaning robot to move around while avoiding the fibrous floor area.

In accordance with another aspect of the disclosure, one or more non-transitory computer-readable storage media storing one or more computer programs including computer-executable instructions that, when executed by one or more processors of a cleaning robot individually or collectively, cause the cleaning robot to perform operations are provided. The operations include identifying, by the cleaning robot, a fibrous floor area while moving around on a cleaning area, determining, by the cleaning robot, based on at least one of a size of the fibrous floor area or a location of the fibrous floor area on a map of the cleaning area, whether the fibrous floor area is a defecation pad area, and causing, by the cleaning robot, based on determining that the fibrous floor area is the defecation pad area, the cleaning robot to move around while avoiding the fibrous floor area.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIGS. 6A, 6B, and 6C show a method by which a cleaning robot identifies a fibrous floor area, according to various embodiments of the disclosure;

FIGS. 7A and 7B show a method by which a cleaning robot identifies a fibrous floor area close to a wall, according to various embodiments of the disclosure;

FIGS. 19A and 19B show a method by which a cleaning robot avoids a defecation pad with reference to a defecation pad area on a map, according to various embodiments of the disclosure;

FIG. 22 is a block diagram of a cleaning robot according to an embodiment of the disclosure.

Throughout the drawings, it should be noted that like reference numbers are used to depict the same or similar elements, features, and structures.

MODE FOR INVENTION

Figure 1:
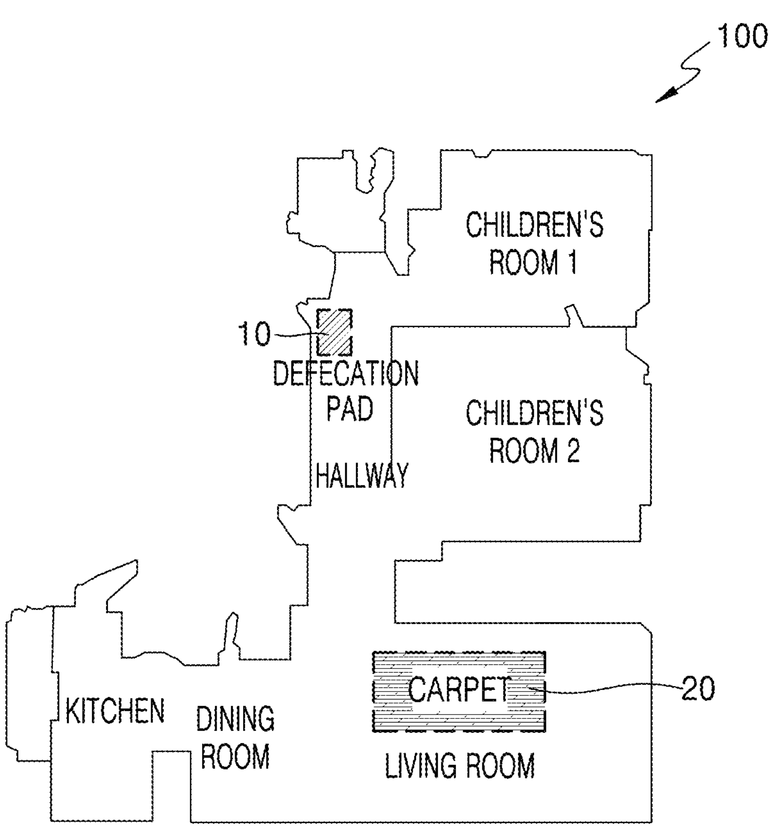
FIG. 1 shows an environment in which a cleaning robot identifies whether to enter a fibrous floor area based on at least one of a size or location of the fibrous floor area, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates "a", "b", "c", "a and b", "a and c", "b and c", "all of a, b, and c", or variations thereof.

Hereinafter, embodiments of the disclosure will be described in detail with reference to the appended drawings in order for one of ordinary skill in the art to readily embody the disclosure. However, the disclosure can be implemented in various different forms, and is not limited to the embodiments described herein. Also, in the drawings, parts irrelevant to the description are not shown in order to definitely describe the disclosure, and throughout the entire specification, similar components are assigned like reference numerals.

Although general terms being currently used were selected as terminology used in the disclosure while considering the functions of the disclosure, they may vary according to intentions of one of ordinary skill in the art, judicial precedents, the advent of new technologies, and the like. Hence, the terms used in the disclosure must be interpreted based on the meanings of the terms and the content of the entire specification, not by simply stating the terms themselves.

Also, it will be understood that, although the terms first, second, etc. may be used herein to describe various components, these components should not be limited by these terms. These terms are only used to distinguish one component from another.

Also, the terms used in the disclosure are used to describe the specific embodiments, not for the purpose of limiting the disclosure. Also, in the entire specification, when a certain portion is referred to as being "connected" to another portion, it can be "directly connected" to the other portion or "electrically connected" to the other portion with an intervening component. Also, when a certain portion "includes" a certain component, the portion does not exclude another component but can further include another component, unless the context clearly dictates otherwise.

The phrases "in some embodiments", "in an embodiment", etc. appearing in the disclosure may not indicate the same embodiment.

An embodiment of the disclosure may provide a cleaning robot for identifying a fiber floor area and a control method thereof.

An embodiment of the disclosure may provide a cleaning robot for distinguishing a defecation pad from other fibers and a control method thereof.

An embodiment of the disclosure may provide a cleaning robot for moving while avoiding a defecation pad and a control method thereof.

An embodiment of the disclosure may provide a cleaning robot for identifying a carpet or rug and a control method thereof.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

FIG. 1 shows an environment in which a cleaning robot 1000 identifies whether to enter a fiber floor area based on at least one of a size or location of the fiber floor area, according to an embodiment of the disclosure.

Referring to FIG. 1, a cleaning robot 1000 (not shown, illustrated in, e.g., FIGS. 2 and 4) may identify a fiber floor area 10 or 20, and identify a use of fibers or a kind of an object laid on the fiber floor area 10 or 20 based on at least one of a size of the fiber floor area 10 or 20 or a location of the fiber floor area 10 or 20 on a map 100.

The fiber floor area 10 or 20 may be a floor area made of fibers. The cleaning robot 1000 may detect a material of a floor on which the cleaning robot 1000 is located, through a floor detection sensor. For example, the cleaning robot 1000 may identify whether the material of the floor is a fiber material, through an infrared sensor provided on a lower surface of the cleaning robot 1000. According to a detection of the floor made of the fiber material, the cleaning robot 1000 may start identifying a size and location of the fiber floor area 10 or 20.

The cleaning robot 1000 may detect, according to a detection of the floor made of the fiber material through the floor detection sensor, a plurality of surrounding locations at which the floor made of the fiber material has been detected, based on a preset driving pattern. The cleaning robot 1000 may identify the fiber floor area 10 or 20 based on the plurality of surrounding locations at which the floor made of the fiber material has been detected.

The cleaning robot 1000 may identify a use of fibers or a kind of an object laid on the fiber floor area 10 or 20 based on at least one of a size of the identified fiber floor area 10 or 20 or a location of the identified fiber floor area 10 or 20 on the map 100. For example, according to the size of the fiber floor area 20 being larger than a reference pad size, the cleaning robot 1000 may identify the use of fibers as a carpet. Also, for example, according to the location of the fiber floor area 20 being near a boundary between adjacent rooms, the cleaning robot 1000 may identify the use of fibers as a rug. Also, for example, according to the size of the fiber floor area 10 being smaller than or equal to the reference pad size and the location of the fiber floor area 10 being a hallway, the cleaning robot 1000 may identify the use of fibers as a defecation pad.

The cleaning robot 1000 may identify whether to enter the fiber floor area 10 or 20 based on the use of fibers laid on the fiber floor area 10 or 20. For example, according to the fiber floor area 10 or 20 being a carpet or rug, the cleaning robot 1000 may enter the fiber floor area 10 or 20 and perform dry cleaning. Also, for example, according to the fiber floor area 10 or 20 being a defecation pad, the cleaning robot 1000 may move while avoiding the fiber floor area 10 or 20.

According to an embodiment of the disclosure, the cleaning robot 1000 may cause the cleaning robot 1000 to move through the fibrous floor area 10 or 20 with increased suction force, based on determining that the fibrous floor area 10 or 20 is not the defecation pad area.

According to an embodiment of the disclosure, the cleaning robot 1000 may determine that the fibrous floor area 10 or 20 is a defecation pad area based on the size of the fibrous floor area 10 or 20. The cleaning robot 1000 may update the map of the cleaning area to include the location of the defecation pad area.

According to an embodiment of the disclosure, the cleaning robot 1000 may move while avoiding the fiber floor area 10 or 20 by moving at a preset distance from the fiber floor area 10 or 20.

In an embodiment of the disclosure, according to the fiber floor area 10 or 20 being a defecation pad, the cleaning robot 1000 may output a notification indicating that a defecation pad has been detected.

According to an embodiment of the disclosure, the cleaning robot 1000 may identify the identified fiber floor area 10 or 20 as a defecation pad area, based on a user input of setting the identified fiber floor area 10 or 20 to the defecation pad area.

In an embodiment of the disclosure, according to the fiber floor area 10 or 20 being located within a defecation pad detectable area set by a user, the cleaning robot 1000 may identify the fiber floor area 10 or 20 as a defecation pad area.

According to an embodiment of the disclosure, a user device 2000 may receive a user input of setting the fiber floor area 10 or 20 displayed on the map 100 to a no-entry area. According to reception of information indicating that the fiber floor area 10 or 20 has been set to a no-entry area, the cleaning robot 1000 may move while avoiding the fiber floor area 10 or 20.

Because the cleaning robot 1000 distinguishes between carpets, rugs, and defecation pads, the cleaning robot 1000 may be prevented from moving on defecation pads.

Figure 2:
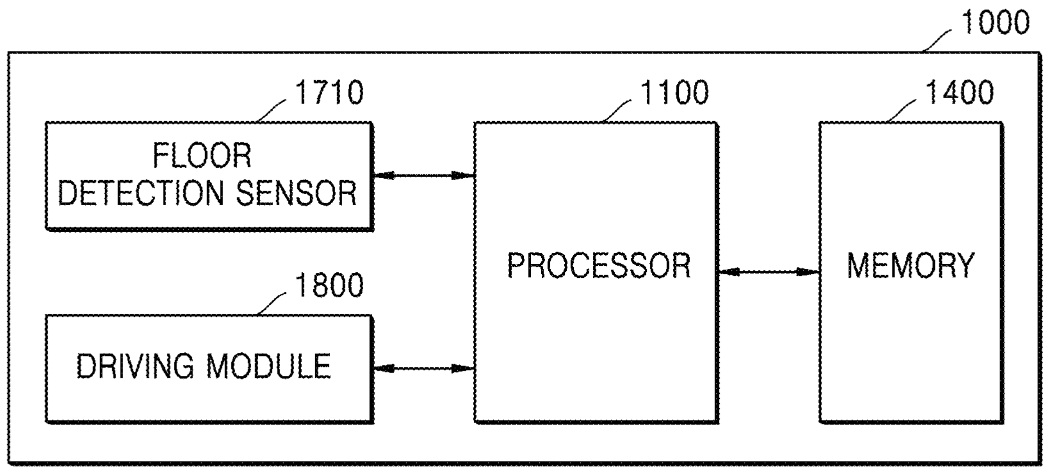
FIG. 2 is a block diagram of a cleaning robot according to an embodiment of the disclosure.

FIG. 2 is a block diagram of the cleaning robot 1000 according to an embodiment of the disclosure.

Referring to FIG. 2, the cleaning robot 1000 may include a processor 1100, memory 1400, a floor detection sensor 1710, and a driving module 1800.

The cleaning robot 1000 may include a dry cleaning robot, a wet cleaning robot dedicated to mopping, and a cleaning robot that performs dry cleaning and wet cleaning simultaneously.

The processor 1100 may control overall operations of the cleaning robot 1000. The processor 1100 may execute at least one instruction or programs stored in the memory 1400 to control the driving module 1800 and the floor detection sensor 1710.

The memory 1400 may store instructions or programs for processing and controlling by the processor 1100.

The driving module 1800 may move a main body of the cleaning robot 1000. The driving module 1800 may be driven according to a control signal set by the processor 1100. The processor 1100 may set a driving route, generate a control signal to move the cleaning robot along the driving route, and output the control signal to the driving module 1800. The driving module 1800 may include a motor for rotating wheels of the cleaning robot 1000, a timing belt installed to transfer power generated in a rear wheel to a front wheel, etc.

The floor detection sensor 1710 may include an infrared sensor, an ultrasonic sensor, a Red-Green-Blue (RGB) sensor, and an infrared camera, although not limited thereto. The floor detection sensor 1710 may be provided on the lower surface of the cleaning robot 1000 and receive light reflected from a floor.

For example, according to the floor detection sensor 1710 being an infrared sensor, the processor 1100 may control the infrared sensor to irradiate infrared light toward a floor at regular time intervals and receive infrared light reflected from the floor. According to a ratio of an amount of infrared light reflected from the floor and received by the infrared sensor with respect to an amount of infrared light irradiated from the infrared sensor being smaller than or equal to a reference ratio, the processor 1100 may identify a material of the floor as fibers.

According to an embodiment of the disclosure, the processor 1100 may identify a fiber floor area through the floor detection sensor 1710 while the cleaning robot 1000 moves on a cleaning area. Also, the processor 1100 may identify whether to enter the fiber floor area, based on at least one of a size of the fiber floor area or a location of the fiber floor area on a map of the cleaning area. Also, according to identification that the cleaning robot 1000 will not enter the fiber floor area, the processor 1100 may control the driving module 1800 such that the cleaning robot 1000 moves while avoiding the fiber floor area.

Figure 3:
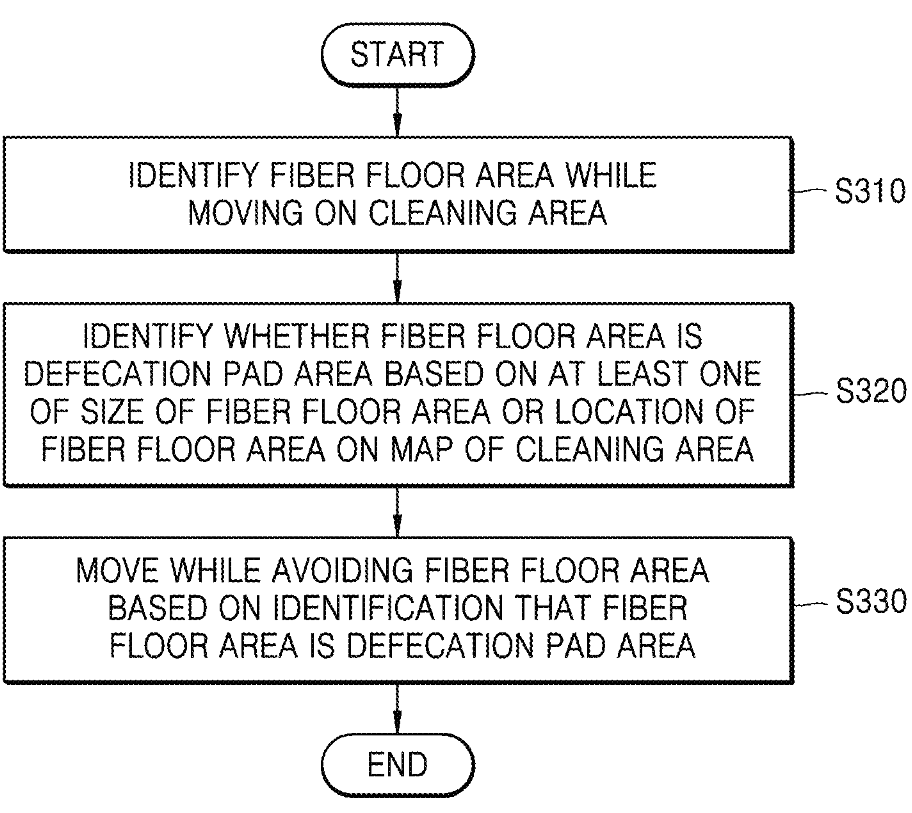
FIG. 3 is a flowchart illustrating a method by which a cleaning robot moves around based on at least one of a size or location of a fibrous floor area, according to an embodiment of the disclosure.

FIG. 3 is a flowchart illustrating a method by which the cleaning robot 1000 moves based on at least one of a size or location of a fiber floor area, according to an embodiment of the disclosure.

In operation S310, the cleaning robot 1000 may identify a fiber floor area while moving on a cleaning area.

The cleaning robot 1000 may detect a floor made of fibers through the floor detection sensor while moving on a cleaning area. According to a detection of the floor made of fibers, the cleaning robot 1000 may start a process of identifying a fiber floor area. For example, the cleaning robot 1000 may detect a plurality of surrounding locations at which the floor made of fibers is detected, based on a preset driving pattern, and identify a fiber floor area based on the plurality of surrounding locations.

In operation S320, the cleaning robot 1000 may identify whether the fiber floor area is a defecation pad area, based on at least one of a size of the fiber floor area or a location of the fiber floor area on the map of the cleaning area.

The cleaning robot 1000 may identify whether the fiber floor area is a defecation pad area based on the size of the fiber floor area. For example, according to the size of the fiber floor area being larger than a reference pad size, the cleaning robot 1000 may identify the fiber floor area as a carpet.

The cleaning robot 1000 may identify whether the fiber floor area is a defecation pad area, based on the location of the fiber floor area on the map. For example, according to the location of the fiber floor area being a wall surface or a corner of a wall surface, the cleaning robot 1000 may identify the fiber floor area as a defecation pad area.

The cleaning robot 1000 may identify the fiber floor area as a defecation pad area, based on the size of the fiber floor area and the location of the fiber floor area on the map. For example, based on the size of the fiber floor area being smaller than the reference pad size and the location of the fiber floor area being within a preset location range on the map, the cleaning robot 1000 may identify the fiber floor area as a defecation pad area.

Also, for example, based on the size of the fiber floor area being smaller than the reference pad size and the location of the fiber floor area not being near a boundary between rooms in the map, the cleaning robot 1000 may identify the fiber floor area as a defecation pad area.

Also, for example, according to the size of the fiber floor area being smaller than or equal to the reference pad size and the location of the fiber floor area being near a boundary between rooms in the map, the cleaning robot 1000 may identify that a rug is laid on the fiber floor area.

Also, for example, according to the size of the fiber floor area being smaller than or equal to the reference pad size and the location of the fiber floor area being near an end of a hallway or a corner of a wall surface in the map, the cleaning robot 1000 may identify that a defecation pad is laid on the fiber floor area.

The cleaning robot 1000 may identify whether the fiber floor area is a defecation pad area, based on at least one of a size of the fiber floor area, a location of the fiber floor area on the map, or a shape of the fiber floor area. For example, the cleaning robot 1000 may photograph a fiber floor area by using an image sensor, and identify a shape of the fiber floor area in a photographed image, and according to the identified shape not being a preset rectangle, oval, or circle, the cleaning robot 1000 may identify that the fiber floor area is not a defecation pad area, although size and location conditions are satisfied.

The cleaning robot 1000 may identify whether the fiber floor area is a defecation pad area, based on a user input of setting the fiber floor area to the defecation pad area. For example, the cleaning robot 1000 may transmit information about the location of the fiber floor area to a server. Also, the cleaning robot 1000 may receive information indicating that the fiber floor area is a defecation pad area from the server, based on a user input of setting the fiber floor area to the defecation pad area on the map. Also, the cleaning robot 1000 may identify the fiber floor area as a defecation pad area based on the received information.

The cleaning robot 1000 may identify whether the fiber floor area is a defecation pad area, based on a defecation pad detectable area set by a user. For example, the cleaning robot 1000 may receive map information including the defecation pad detectable area from the server, based on a user input of setting a certain area in the cleaning area on the map of the cleaning area to the defecation pad detectable area. Also, based on the fiber floor area being located within the defecation pad detectable area, the cleaning robot 1000 may identify the fiber floor area as a defecation pad area.

In operation S330, based on identification that the fiber floor area is a defecation pad area, the cleaning robot 1000 may move while avoiding the fiber floor area.

The cleaning robot 1000 may move at a preset distance from the defecation pad area.

Based on identification that the fiber floor area is a defecation pad area, the cleaning robot 1000 may output a blink or beep indicating that a defecation pad area has been found.

Based on identification that the cleaning robot 1000 will enter a fiber floor area while performing both dry cleaning and wet cleaning, the cleaning robot 1000 may stop wet cleaning and perform dry cleaning within the fiber floor area.

The cleaning robot 1000 may identify a fiber floor area based on a preset pattern, and according to the identified fiber floor area being a defecation pad area, the cleaning robot 1000 may store map information indicating that the identified fiber floor area is a defecation pad area. Also, the cleaning robot 1000 may move while avoiding the defecation pad area based on the stored map information.

Upon next driving after the identified defecation pad area is stored as map information, the cleaning robot 1000 may start moving based on the stored map. In this case, according to a detection of a fiber floor within a surrounding area including the defecation pad area while the cleaning robot 1000 moves based on the stored map, the cleaning robot 1000 may identity the detected fiber floor as a part of a defecation pad. Also, according to identification of the detected fiber floor as a part of a defecation pad, the cleaning robot 1000 may move while avoiding the detected fiber floor without identifying a fiber floor area including the detected fiber floor.

Also, based on a detection of a fiber floor within the surrounding area including the defecation pad area while the cleaning robot 1000 moves based on the stored map information, the cleaning robot 1000 may update the location of the defecation pad area on the map. Also, the cleaning robot 1000 may move while avoiding the updated defecation pad area.

Figure 4:
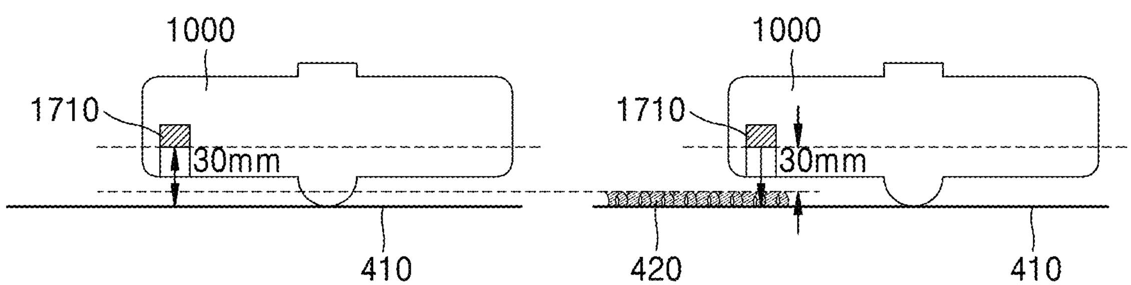
FIG. 4 shows a method by which a cleaning robot detects a material of a floor, according to an embodiment of the disclosure.

FIG. 4 shows a method by which the cleaning robot 1000 detects a material of a floor, according to an embodiment of the disclosure.

Referring to FIG. 4, the cleaning robot 1000 may detect a material of a floor on which the cleaning robot 1000 is located, through the floor detection sensor 1710.

As shown in a left figure of FIG. 4, the cleaning robot 1000 may be located on a non-fiber floor 410. The non-fiber floor 410 may be a room's finished floor finished with a material, such as ceramic tile, marble tile, porcelain tile, wood, vinyl tile, or vinyl flooring. Also, the non-fiber floor 410 may include a vinyl mat, wood mat, or plastic rug laid on a finished floor.

Also, as shown in a right figure of FIG. 4, the cleaning robot 1000 may detect a fiber floor 420. The fiber floor 420 may include a carpet, rug, or defecation pad laid on the non-fiber floor 410. Also, the fiber floor 420 may be a room's finished floor finished with a carpet material.

The floor detection sensor 1710 may be positioned in a front portion of the cleaning robot 1000. For example, the floor detection sensor 1710 may be positioned in front of a battery, a brush, wheels, and a mop pad device. Accordingly, the cleaning robot 1000 may identify that a material of a floor is fibers, before the brush, wheels, and mop pad contact the fiber floor.

The floor detection sensor 1710 may be positioned at a height of 30 mm from the floor, although not limited thereto.

The floor detection sensor 1710 may include an infrared sensor, an ultrasonic sensor, an RGB sensor, and an infrared camera, although not limited thereto.

According to the floor detection sensor 1710 being an infrared sensor or an ultrasonic sensor, the floor detection sensor 1710 may irradiate infrared light or ultrasonic waves toward a floor. According to a floor being a hard floor, such as a wood material or a ceramic material, most of infrared light or ultrasonic waves irradiated onto the floor may be reflected and received by the floor detection sensor 1710. However, according to a floor being made of a fiber material, such as a carpet, a rug, or a defecation pad, infrared light or ultrasonic waves irradiated onto the floor may be diffusely reflected and only a part of the infrared light or ultrasonic waves may be received by the floor detection sensor 1710.

According to an embodiment of the disclosure, the processor 1100 may control an infrared sensor to irradiate infrared light toward a floor at regular time intervals and receive infrared light reflected from the floor. According to a ratio of an amount of infrared light reflected from the floor and received by the infrared sensor with respect to an amount of infrared light irradiated from the infrared sensor being less than or equal to a reference ratio, the processor 1100 may identify a material of the floor as fibers.

According to an embodiment of the disclosure, the processor 1100 may control an ultrasonic sensor to irradiate ultrasonic waves toward a floor at regular time intervals and receive ultrasonic waves reflected from the floor. According to a ratio of an amount of ultrasonic waves reflected from the floor and received by the ultrasonic sensor with respect to an amount of ultrasonic waves irradiated from the ultrasonic sensor being less than or equal to a reference ratio, the processor 1100 may identify a material of the floor as fibers.

According to an embodiment of the disclosure, the floor detection sensor 1710 may be a RGB camera, and in this case, the floor detection sensor 1710 may photograph a floor on which the cleaning robot 1000 is located or a floor located in front of the cleaning robot 1000. The processor 1100 may photograph a floor through the RGB camera, and perform object recognition to detect a carpet, a rug, or a defecation pad in a photographed image.

According to an embodiment of the disclosure, the floor detection sensor 1710 may be an infrared camera, and in this case, the floor detection sensor 1710 may irradiate infrared light having a preset pattern shape toward a floor. Also, the floor detection sensor 1710 may receive infrared light reflected from the floor through the infrared sensor. The processor 1100 may generate an infrared light image based on the infrared light received by the floor detection sensor 1710, and according to a matching rate of a shape in the generated image with a preset pattern shape being less than or equal to a reference value, the processor 1100 may identify a material of the floor as fibers.

According to an embodiment of the disclosure, the processor 1100 may identify whether a floor is made of a fiber material based on at least one of a load of a brush motor, a load of a wheel motor, or a sensing value by an Inertial Measurement Unit (IMU) sensor. For example, according to a load of the brush motor or the wheel motor being greater than a reference value, the processor 1100 may identify that a floor on which the cleaning robot 1000 is located is made of a fiber material. For example, according to a sensing value by the IMU sensor being deviated from a reference range although a load of the brush motor or the wheel motor is greater than the reference value, the processor 1100 may identify that a floor on which the cleaning robot 1000 is located is not made of a fiber material. The IMU sensor may detect inertia of a device equipped with the IMU sensor. Also, the IMU sensor may detect a gradient of the device equipped with the IMU sensor. Also, the IMU sensor may include at least one of a gyroscope, an acceleration sensor, or a geomagnetic sensor.

Figure 5:
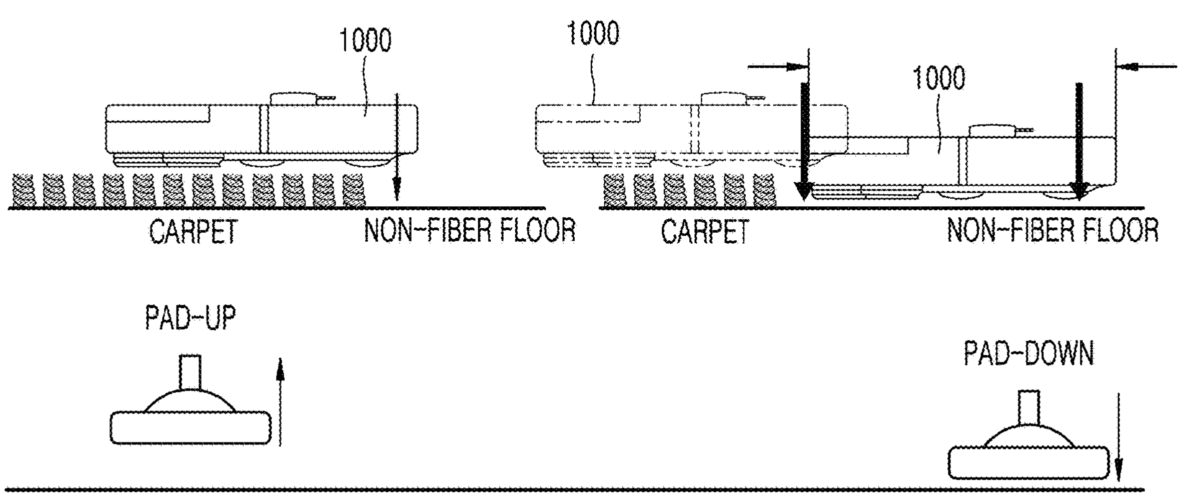
FIG. 5 shows a method by which a cleaning robot cleans a fibrous floor area, according to an embodiment of the disclosure.

FIG. 5 shows a method by which the cleaning robot 1000 cleans a fiber floor area, according to an embodiment of the disclosure.

Referring to a left figure of FIG. 5, according to identification that a fiber floor area is a carpet while the cleaning robot 1000 performs both dry cleaning and wet cleaning, the cleaning robot 1000 may decide to start cleaning the carpet. According to the decision to start cleaning the carpet, the cleaning robot 1000 may stop operating a wet cleaning module, pad-up a wet mop pad, and then climb onto the carpet. Accordingly, the carpet may be prevented from becoming wet or dirty by the wet mop pad.

Also, according to identification that the fiber floor area is a carpet, the cleaning robot may raise a suction force to a suction force set in advance to correspond to a carpet. Accordingly, the cleaning robot 1000 may more strongly suck dust stuck in the carpet.

Referring to a right part of FIG. 5, while the cleaning robot 1000 cleans the carpet on the carpet, the cleaning robot 1000 may detect a non-fiber floor. The non-fiber floor may be a finished floor made of a hard material.

Based on the detection of the non-fiber floor, the cleaning robot 1000 may stop cleaning the carpet and decide to come down to the non-fiber floor. Alternatively, based on completion of carpet cleaning, the cleaning robot 1000 may stop cleaning the carpet and decide to come down to the non-fiber floor.

Based on the decision to come down to the non-fiber floor, the cleaning robot 1000 may pad-down the wet mop pad and again start operating the wet cleaning module. Also, the cleaning robot 1000 may lower the suction force to the suction force before cleaning the carpet.

Figure 6A:
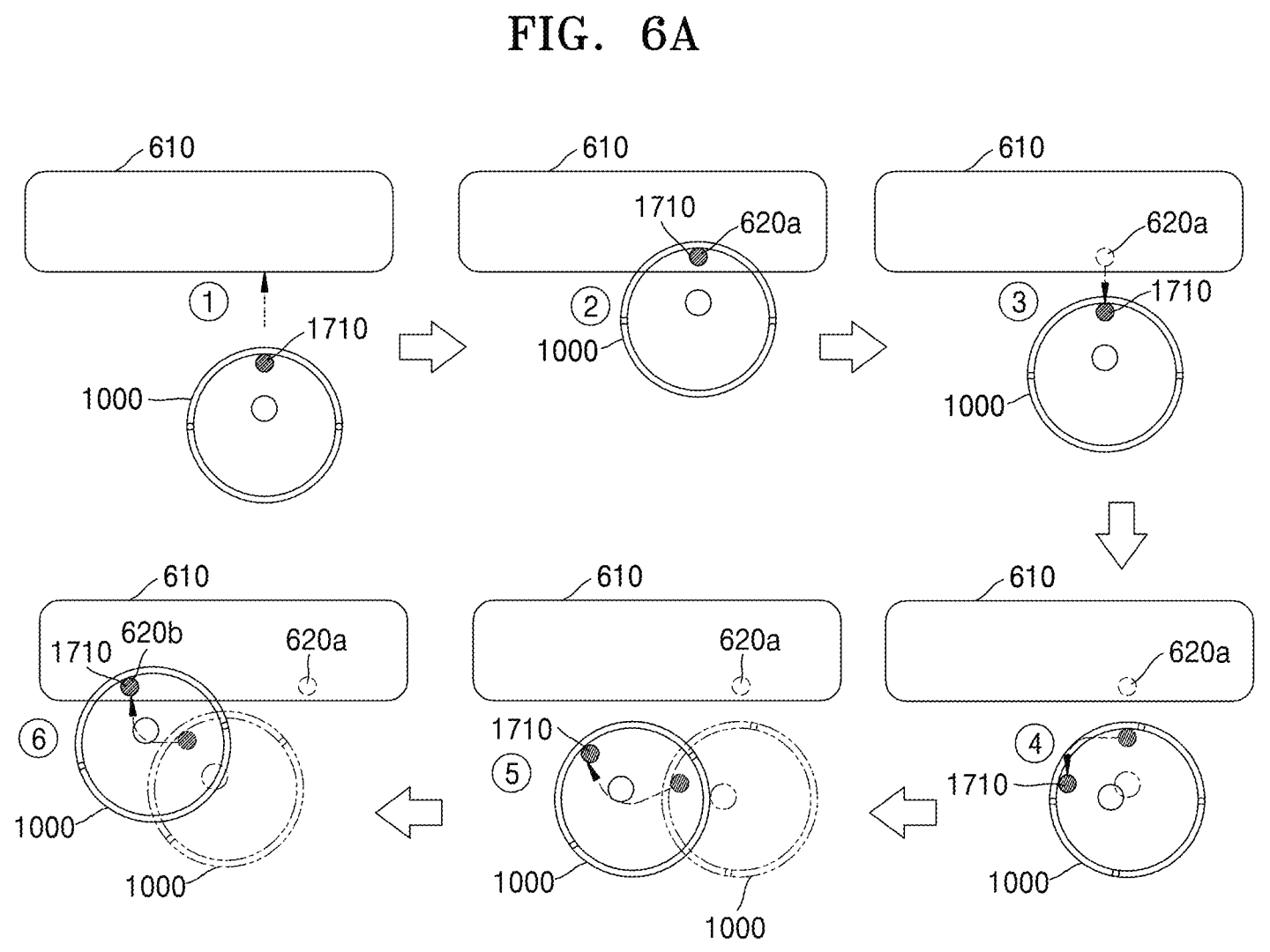
Figure 6B:
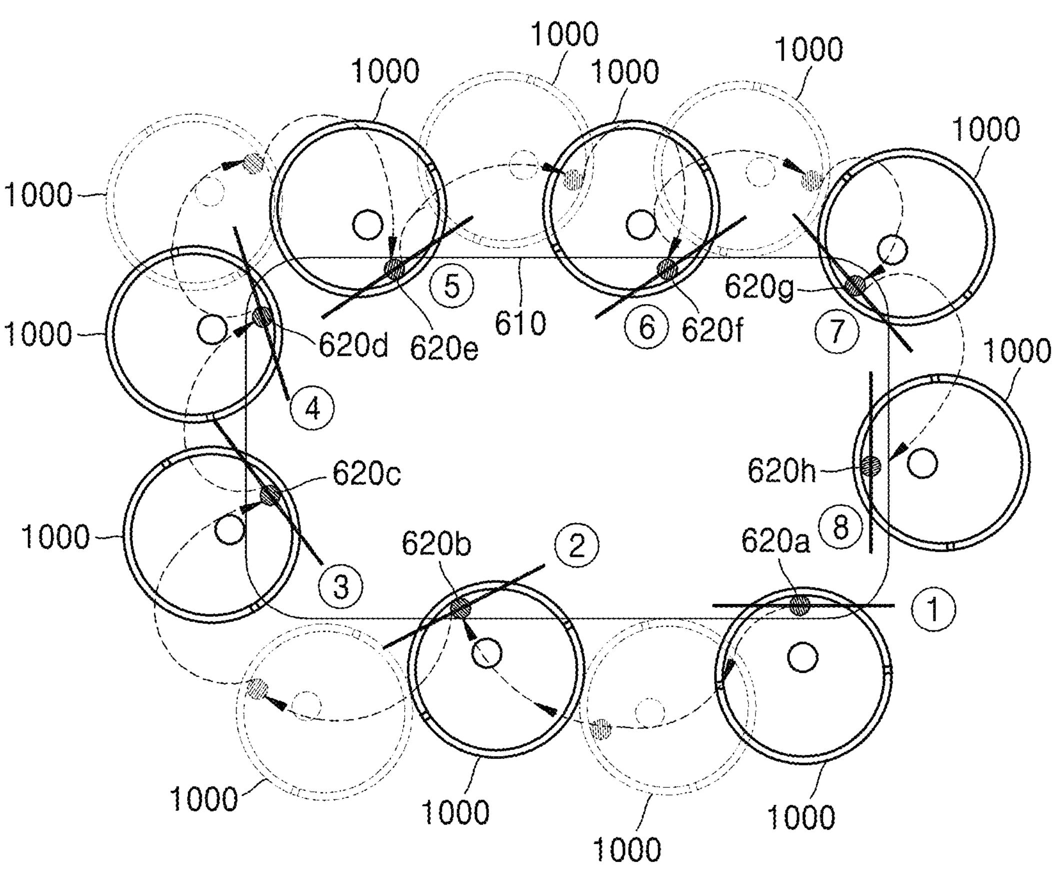
Figure 6C:
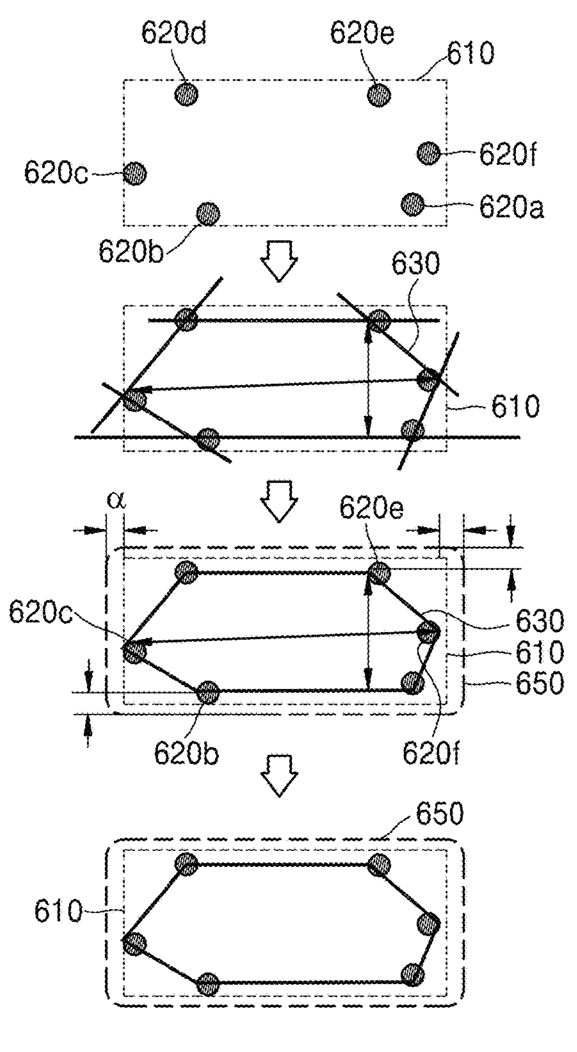

FIGS. 6A to 6C show a method by which the cleaning robot 1000 identifies a fiber floor area, according to various embodiments of the disclosure.

Referring to FIG. 6A, according to a detection of a floor made of a fiber material through the floor detection sensor 1710, the cleaning robot 1000 may search a surrounding area based on a preset driving pattern.

The preset driving pattern may be, for example, a pattern of reversing, then rotating in a counterclockwise direction, and moving upward and left in an elliptical shape. Also, the preset driving pattern may be, for example, a pattern of reversing, then rotating in a clockwise direction, and moving upward and right in an elliptical shape.

While the cleaning robot 1000 moves straight as shown in FIG. 1, the cleaning robot 1000 may detect a floor made of a fiber material through the floor detection sensor 1710 as shown in FIG. 2. According to the detection of the floor made of the fiber material, the cleaning robot 1000 may decide to start a process of identifying a fiber floor area 610 based on the preset driving pattern. Also, the cleaning robot 1000 may store a location on a map, corresponding to a location 620*a* (also, referred to as a first location 620*a*) at which the floor made of the fiber material has been detected.

Figure 6C:
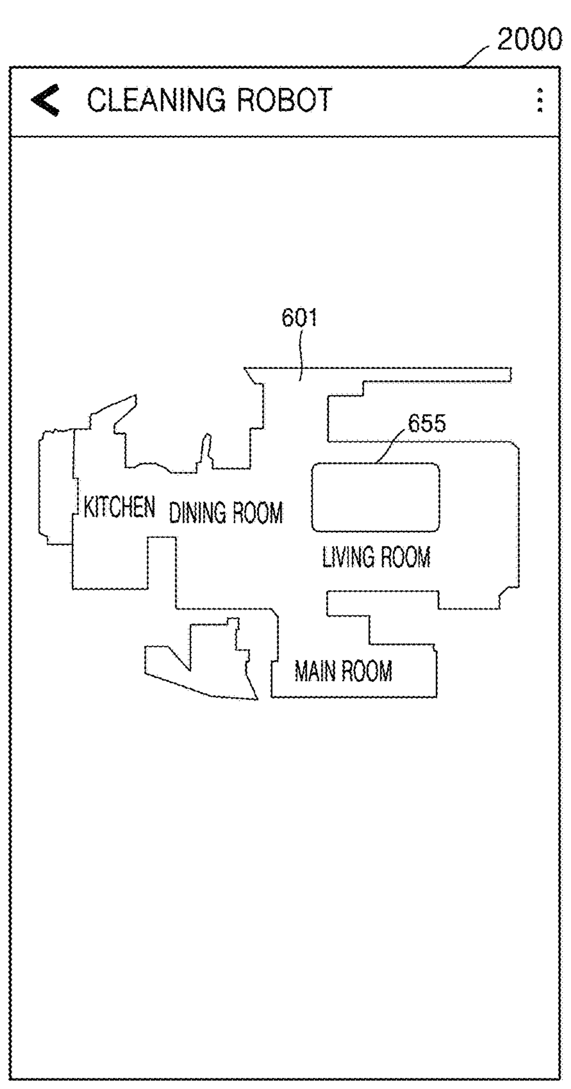

First, the cleaning robot 1000 may reverse a preset distance as shown in FIG. 3. Then, the cleaning robot 1000 may rotate to a preset angle (for example, 45 degrees) in the clockwise direction as shown in FIG. 4. Successively, the cleaning robot 1000 may move upward and left according to a first pattern as shown in FIG. 3, and then move upward and left according to a second pattern as shown in FIG. 6. According to a detection of a floor made of a fiber material while the cleaning robot 1000 moves according to the preset driving pattern, the cleaning robot 1000 may store a location on the map, corresponding to a location 620*b* (also, referred to as a second location 620*b*) at which the floor made of the fiber material has been detected.

Referring to FIG. 6B, the cleaning robot 1000 may detect a plurality of floors made of a fiber material around the fiber floor area 610 by repeatedly moving in the preset driving pattern.

The preset driving pattern may be, for example, a pattern of rotating to a preset angle in the counterclockwise direction and then moving upward and left in an elliptical shape.

As shown in FIG. 6B, the cleaning robot 1000 may detect a floor made of a fiber material at the first location 620*a* while moving. Based on the detection of the floor made of the fiber material while moving, the cleaning robot 1000 may decide to start a process of identifying the fiber floor area 610. According to the decision to start the process of identifying the fiber floor area 610, the cleaning robot 1000 may detect the second location 620*b* to an eighth location 620*h* of the fiber floor area 610 by repeatedly moving in the preset driving pattern.

For example, as shown in FIG. 6B, while the cleaning robot 1000 moves in the preset driving pattern from the first location 620*a* at which a floor made of a fiber material has been first detected, the cleaning robot 1000 may detect a floor made of a fiber material at the second location 620*b*. Successively, while the cleaning robot 1000 moves in the preset driving pattern from the second location 620*b*, the cleaning robot 1000 may detect a floor made of a fiber material at a third location 620*c*. The cleaning robot 1000 may detect a floor made of a fiber material at fourth to eighth locations 620*d*, 620*e*, 620*f*, 620*g*, and 620*f* in the same pattern.

Also, the cleaning robot 1000 may identify locations on a map of a cleaning area, corresponding to the first to eighth locations 620*a* to 620*h*. For example, the cleaning robot 1000 may identify a location on the map, corresponding to the first location 620*a* at which the floor made of the fiber material has been detected, based on a current location of the cleaning robot 1000 on the map.

Referring to a first figure on the left of FIG. 6C, the cleaning robot 1000 may detect a plurality of floors 620*a* to 620*f* made of a fiber material around the fiber floor area 610.

Referring to a second figure on the left of FIG. 6C, the cleaning robot 1000 may generate a closed loop 630 by connecting the floors 620*a* to 620*f* made of the fiber material to each other.

According to an embodiment of the disclosure, according to the detection of the locations 620*a* to 620*f* at which the floor made of the fiber material has been detected, the cleaning robot 1000 may connect adjacent locations to each other. According to the generation of the closed loop 630 by connecting the adjacent locations 620*a* to 620*f* to each other, the cleaning robot 1000 may stop detecting a surrounding location made of a fiber material.

According to an embodiment of the disclosure, based on a final location at which a floor made of a fiber material has been detected being between adjacent ones among the previously detected locations 620*a* to 620*f*, the cleaning robot 1000 may stop detecting a surrounding location made of a fiber material and connect adjacent ones of the previously detected locations 620*a* to 620*f* to each other, thereby generating the closed loop 630.

Referring to a third figure on the left of FIG. 6C, the cleaning robot 1000 may identify an area 650 surrounding the closed loop 630 as an area representing the fiber floor area 610.

According to an embodiment of the disclosure, the cleaning robot 1000 may identify a rectangular area 650 with four sides spaced a preset margin distance (a in the third figure of FIG. 6C) from outer points 620*b*, 620*c*, 620*e*, and 620*f* of the closed loop 630, as an area representing the fiber floor area 610.

Accordingly, referring to a fourth figure on the left of FIG. 6C, the area 650 representing the fiber floor area 610 may be larger than an actual fiber floor area 610.

Also, the cleaning robot 1000 may store a location of the area 650 representing the fiber floor area 610, as map information. Referring to a right figure of FIG. 6C, the user device 2000 may display an image 655 of the area 650 representing the fiber floor area 610, while displaying a map image 601 of a cleaning area.

Figure 7B:
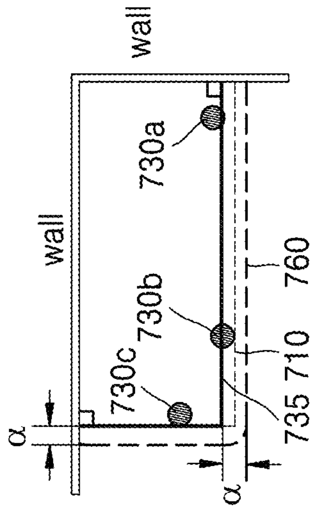
Figure 7B:
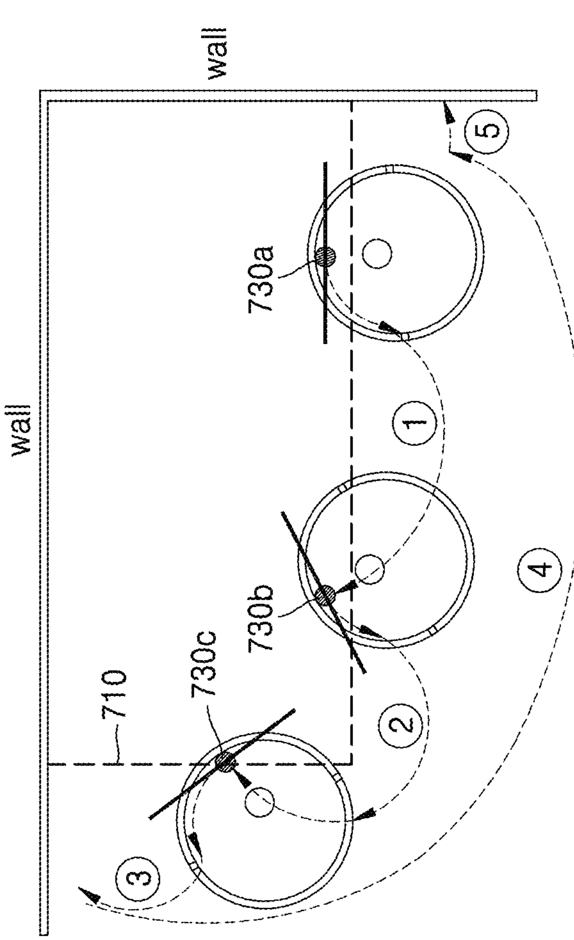

FIGS. 7A and 7B show a method by which the cleaning robot 1000 identifies a fiber floor area close to a wall, according to various embodiments of the disclosure.

Referring to FIG. 7A, the cleaning robot 1000 may detect a location of a wall through a position sensor (for example, light detection and ranging (LiDAR)) while moving. According to identification that a fiber floor area 710 is close to a wall, the cleaning robot 1000 may identify the wall as an edge of the fiber floor area 710.

Referring to a left figure of FIG. 7A, the cleaning robot 1000 may detect a floor made of a fiber material while moving, and store a location on a map of a cleaning area, corresponding to a detected location 720*a*. Also, the cleaning robot 1000 may move based on a preset driving pattern from the location 720*a* first detected and detect a floor made of a fiber material at a second location 720*b*. For example, the cleaning robot 1000 may detect the floor made of the fiber material at the second location 720*b* by rotating to a preset angle in the counterclockwise direction at the first location 720*a* and then moving in the clockwise direction in an elliptical shape, as shown in FIG. 1. Successively, the cleaning robot 1000 may move based on the preset driving pattern from the second location 720*b*, and detect a floor made of a fiber material at a third location 720*c*, as shown in FIG. 2.

According to the fiber floor area 710 being close to the wall, the cleaning robot 1000 may collide with the wall while moving based on the same driving pattern from the third location 720*c*, as shown in FIG. 3. In the case in which the cleaning robot 1000 collides with the wall while identifying the fiber floor area 710, the cleaning robot 1000 may move to an undetected location, as shown in FIG. 4. For example, the cleaning robot 1000 may search for a floor made of a fiber material while moving to a point 725 located in an opposite direction to the direction from the first location 720*a* to the second location 720*b*. In the case in which the cleaning robot 1000 fails to detect a floor made of a fiber material while moving to the point 725 located in the opposite direction, the cleaning robot 1000 may identify the fiber floor area 710 while moving in an opposite pattern to the previous driving pattern.

For example, as shown in FIG. 5, while the cleaning robot 1000 moves in the counterclockwise direction in an elliptical shape, the cleaning robot 1000 may detect a floor made of a fiber material at a fourth location 720*d*. Successively, the cleaning robot 1000 may collide with the wall by rotating in the clockwise direction at the fourth location 720*d* and then moving in the counterclockwise direction in an elliptical shape. In this case, the cleaning robot 1000 may stop detecting a floor made of a fiber material around the fiber floor area 710, and identify a location and size of the fiber floor area 710 based on the detected locations 720*a* to 720*d*.

Referring to a right figure of FIG. 7A, the cleaning robot 1000 may connect adjacent locations to each other in such a way as to connect the locations 720*c* and 720*d* being adjacent to the wall among the locations 720*a* to 720*d* from which the floor made of the fiber material has been detected, vertically to the wall, thereby generating a closed loop 730 including a wall surface.

According to an embodiment of the disclosure, the cleaning robot 1000 may identify a rectangular area 750 surrounding the closed loop 730 as an area representing the fiber floor area 710. In this case, the cleaning robot 1000 may identify a rectangular area 750 with three sides spaced a preset margin distance (a in the right figure of FIG. 6A) from outer points 720*b*, 720*c*, and 720*d* of the closed loop 730 and one side being the wall, as an area representing the fiber floor area 710. Accordingly, the area 750 representing the fiber floor area 710 may be larger than an actual fiber floor area 710.

Referring to FIG. 7B, according to a fiber floor area 710 being located at a corner of two walls, the cleaning robot 1000 may identify the fiber floor area 710 by considering the two walls.

Referring to a left figure of FIG. 7B, the cleaning robot 1000 may detect a floor made of a fiber material while moving, and store a location on a map of a cleaning area, corresponding to a detected location 730*a* (also, referred to as a first location 730*a*). Also, while the cleaning robot 1000 moves based on a preset driving pattern from the location 730*a* first detected, the cleaning robot 1000 may detect a floor made of a fiber material at a second location 730*b*. For example, the cleaning robot 1000 may detect the floor made of the fiber material at the second location 730*b* by rotating to a preset angle in the counterclockwise direction at the first location 730*a* and then moving in the clockwise direction in an elliptical shape, as shown in FIG. ①. Successively, the cleaning robot 1000 may move based on the preset driving pattern from the second location 730*b*, and detect a floor made of a fiber material at a third location 730*c*, as shown in FIG. ②.

According to the fiber floor area 710 being close to a wall, the cleaning robot 1000 may collide with the wall while moving based on the same driving pattern from the third location 730*c*, as shown in FIG. ③. In the case in which the cleaning robot 1000 collides with the wall while identifying the fiber floor area 710, the cleaning robot 1000 may move to an undetected location, as shown in FIG. ④. For example, the cleaning robot 1000 may search for a floor made of a fiber material while moving in an opposite direction to the direction from the first location 730*a* to the second location 730*b*. According to the collision with the wall while the cleaning robot 1000 moves in the opposite direction, the cleaning robot 1000 may stop detecting a floor made of a fiber material around the fiber floor area 710, and identify a location and size of the fiber floor area 710 based on the detected locations 730*a* to 730*c*.

Referring to a right figure of FIG. 7B, the cleaning robot 1000 may connect adjacent locations to each other in such a way as to connect the locations 730*a* and 730*c* being adjacent to the wall among the locations 730*a* to 730*c* from which the floor made of the fiber material has been detected, vertically to the wall, thereby generating a closed loop 735 including a wall surface.

According to an embodiment of the disclosure, the cleaning robot 1000 may identify a rectangular area 760 surrounding the closed loop 735 as an area representing the fiber floor area 710. In this case, the cleaning robot 1000 may identify a rectangular area 760 with two sides spaced a preset margin distance (a in the right figure of FIG. 7B) from outer points 730*b* and 730*c* of the closed loop 735 and two sides being the two walls, as an area representing the fiber floor area 710. Accordingly, the area 760 representing the fiber floor area 710 may be larger than an actual fiber floor area 710.

Figure 8:
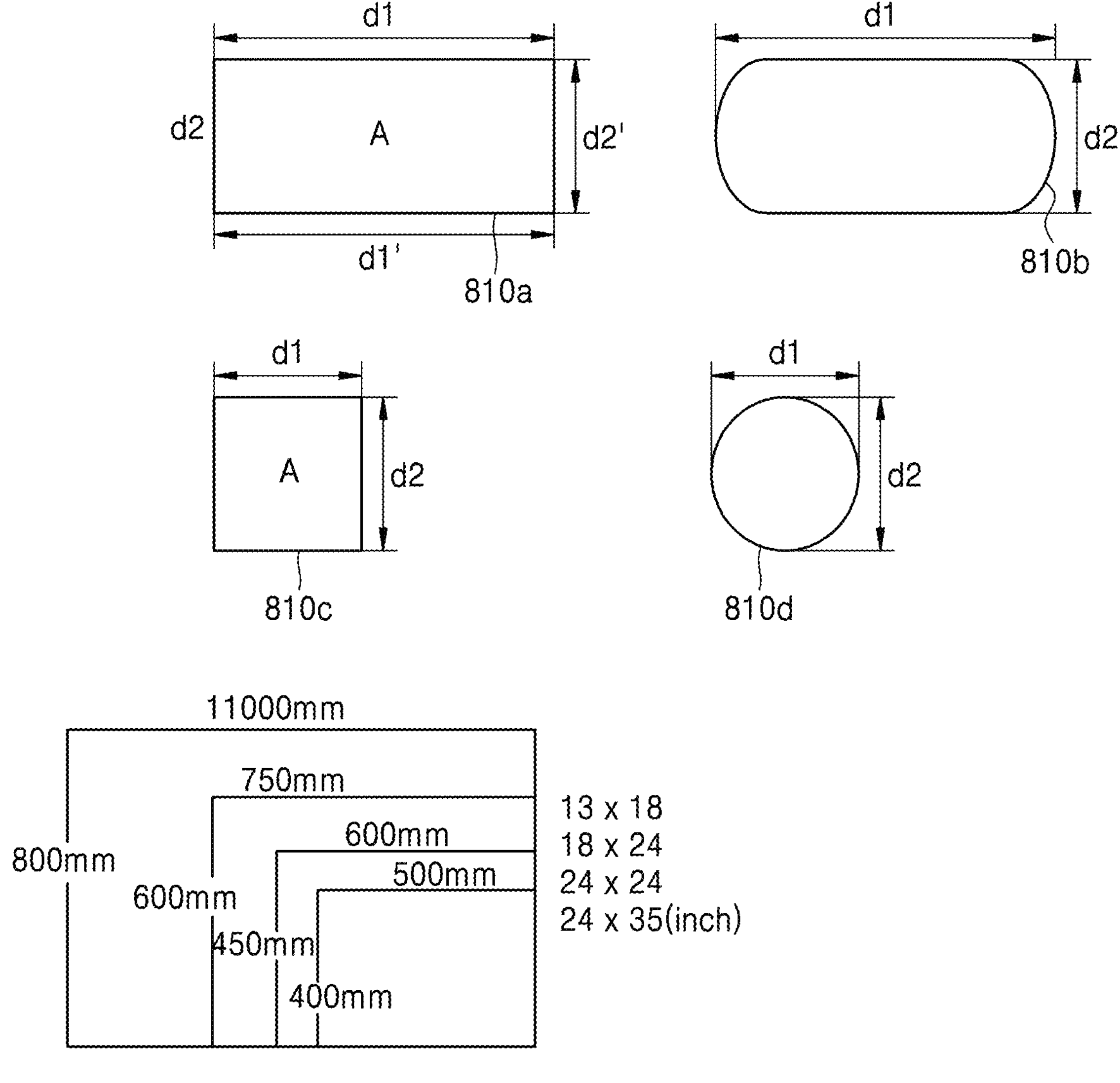
FIG. 8 shows a method by which a cleaning robot identifies a use of fibers laid on a fibrous floor area based on a size of the fibrous floor area, according to an embodiment of the disclosure.

FIG. 8 shows a method by which the cleaning robot 1000 identifies a use of fibers laid on a fiber floor area based on a size of the fiber floor area, according to an embodiment of the disclosure.

Referring to FIG. 8, the cleaning robot 1000 may identify sizes of fiber floor areas 810*a* to 810*d*, and identify uses of fibers or kinds of objects laid on the fiber floor areas 810*a* to 810*d* based on the identified sizes.

The cleaning robot 1000 may calculate an area of each of the fiber floor areas 810*a* and 810*c* in a rectangular shape based on horizontal and vertical lengths of each of the fiber floor areas 810*a* and 810*c*. Also, the cleaning robot 1000 may calculate an area of the fiber floor area 810*d* in a circular shape based on a diameter of the fiber floor area 810*d*. Also, the cleaning robot 1000 may calculate an area of the fiber floor area 810*b* in an oval shape based on lengths of major and minor axes of the fiber floor area 810*b*.

In an embodiment of the disclosure, according to an area of each of the fiber floor areas 810*a* to 810*d* being smaller than a threshold area value, the cleaning robot 1000 may identify a use of fibers laid on each of the fiber floor areas 810*a* to 810*d* as a pet defecation pad. According to an area of each of the fiber floor areas 810*a* to 810*d* being larger than or equal to the threshold area value, the cleaning robot 1000 may identify a use of fibers laid on each of the fiber floor areas 810*a* to 810*d* as a rug or carpet.

According to an embodiment of the disclosure, the threshold area value for the fiber floor areas 810*a* to 810*d* may have been set in advance based on a size of a pet defecation pad being sold.

For example, a small size defecation pad may be 50 cm*40 cm and an extra-large size as a largest size defecation pad may be 110 cm*80 cm. In this case, the threshold area value of the fiber floor areas 810*a* to 810*d* may be an area of the extra-large size. Also, for example, the threshold area value of the fiber floor areas 810*a* to 810*d* may be an area of a most popular medium size (60 cm*45 cm). The threshold area value may be within a range of 2,000 $cm^2$ to 88,000 $cm^2$ based on the sizes of pet defecation pads being sold.

According to an embodiment of the disclosure, the threshold area value for the fiber floor areas 810*a* to 810*d* may be set by a user. The user device 2000 may receive a user input of setting a threshold area value for the fiber floor areas 810*a* to 810*d* through an application. For example, the user device 2000 may display a user interface for enabling a user to select a size of a currently used defecation pad, and transmit a defecation pad size received through the user interface as a threshold area value for the fiber floor areas 810*a* to 810*d* to the cleaning robot 1000 through a server.

Figure 9:
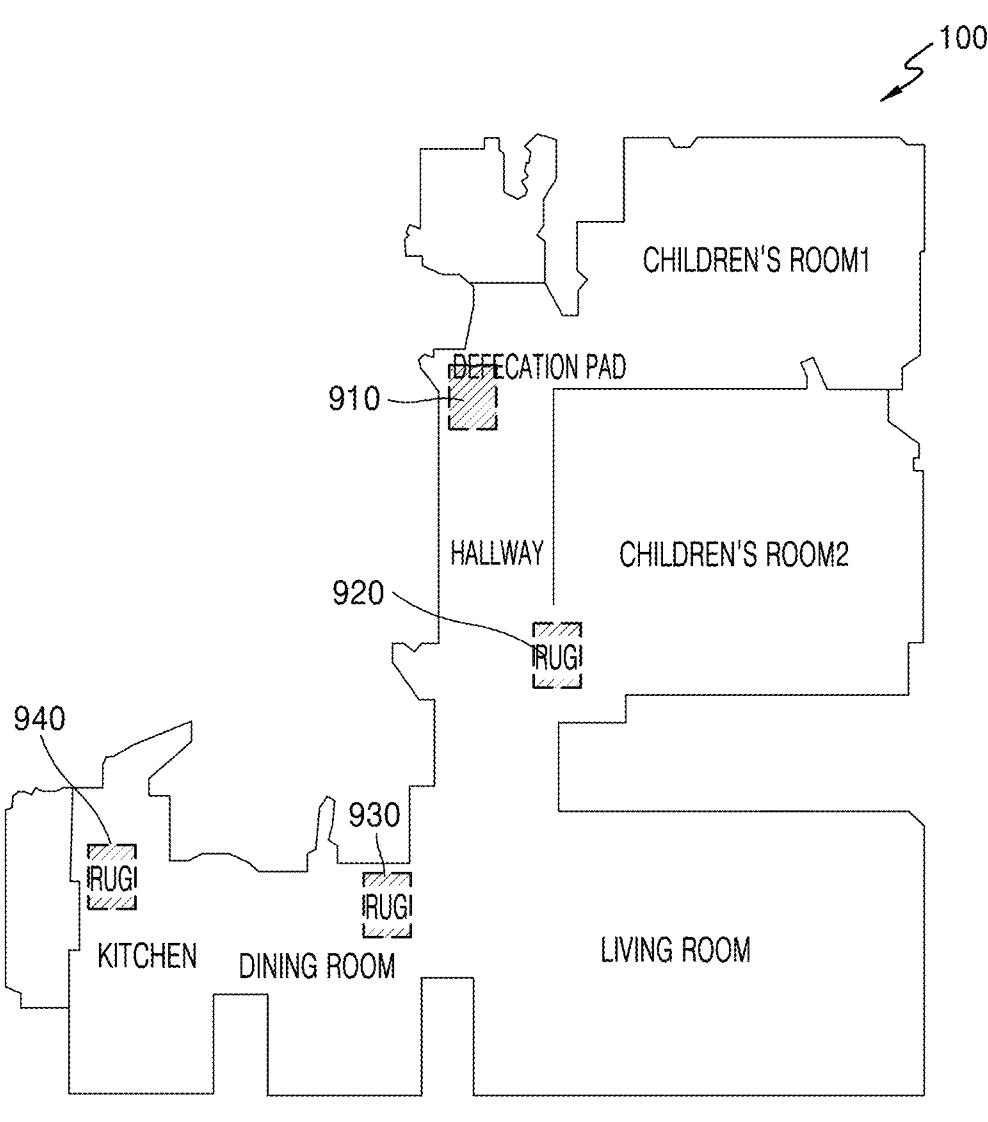
FIG. 9 shows a method by which a cleaning robot identifies a use of fibers laid on a fibrous floor area based on a location of the fibrous floor area, according to an embodiment of the disclosure.

FIG. 9 shows a method by which the cleaning robot 1000 identifies a use of fibers laid on a fiber floor area based on a location of the fiber floor area, according to an embodiment of the disclosure.

Referring to FIG. 9, the cleaning robot 1000 may identify a use of fibers or a kind of an object laid on a fiber floor area based on a location of the fiber floor area on a map.

In an embodiment of the disclosure, according to a location of a detected fiber floor area on the map being a kitchen, a dining room, or near a boundary (for example, near a boundary between a hallway and a room) between adjacent rooms, the cleaning robot 1000 may identify a use of fibers laid on the fiber floor area as a rug. Referring to FIG. 9, the cleaning robot 1000 may identify a use of fibers laid on a fiber floor area 920 located at a boundary between a hallway and a children's room 2, a fiber floor area 930 located at a dining room, and a fiber floor area 940 located at a kitchen, as a rug.

In an embodiment of the disclosure, according to a location of a detected fiber floor area on the map being a hallway except for near a boundary between rooms, an end of a hallway, or near a wall surface or a corner of a wall surface, the cleaning robot 1000 may identify a use of fibers laid on the fiber floor area as a defecation pad. For example, according to a location of a detected fiber floor area on the map being in close contact with a wall surface, the cleaning robot 1000 may identify a use of fibers laid on the fiber floor area as a defecation pad. Referring to FIG. 9, the cleaning robot 1000 may identify a use of fibers of a fiber floor area 910 located in close contact with a wall surface of a hallway, as a defecation pad.

According to an embodiment of the disclosure, a location of a fiber floor area identified as a rug on the map and a location of a fiber floor area identified as a defecation pad on the map may have been set in advance in the cleaning robot 1000 based on users' use patterns.

According to an embodiment of the disclosure, a user device may receive a user input of setting a location of a carpet, a location of a rug, or a location of a defecation pad. The user device may transmit the location of the carpet, the location of the rug, or the location of the defecation pad, set by a user, to the server. The cleaning robot 1000 may receive the location of the carpet, the location of the rug, or the location of the defecation pad, set by the user, from the server.

Figure 10:
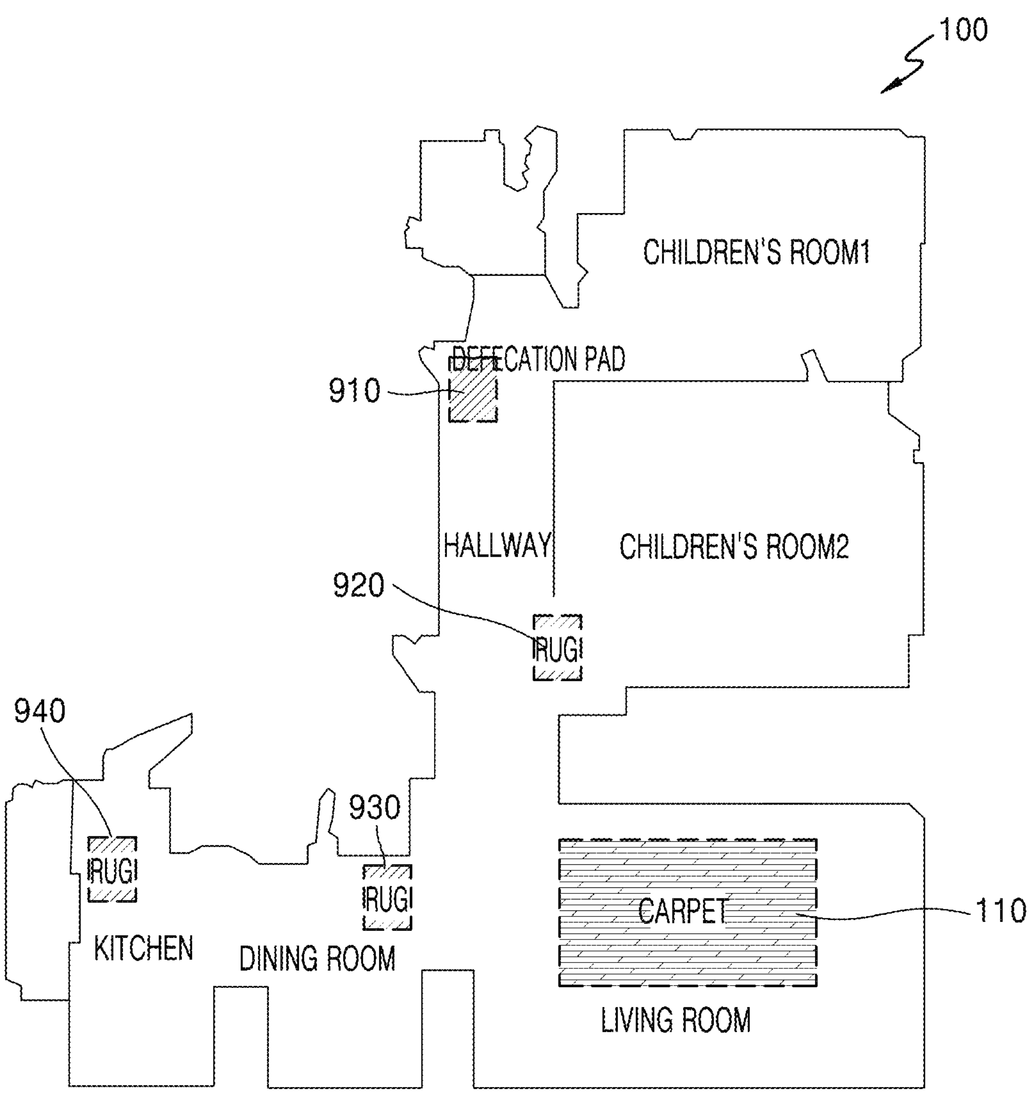
FIG. 10 shows a method by which a cleaning robot identifies a use of fibers laid on a fibrous floor area based on a size and location of the fibrous floor area, according to an embodiment of the disclosure.

FIG. 10 shows a method by which the cleaning robot 1000 identifies a use of fibers laid on a fiber floor area based on a size and location of the fiber floor area, according to an embodiment of the disclosure.

Referring to FIG. 10, the cleaning robot 1000 may identify a use of fibers or a kind of an object laid on a fiber floor area based on a size of the fiber floor area and a location of the fiber floor area on a map.

In an embodiment of the disclosure, according to an area of a fiber floor area being smaller than a threshold area value, the cleaning robot 1000 may identify a use of fibers laid on the fiber floor area as a pet defecation pad or a rug. According to an area of a fiber floor area being larger than or equal to the threshold area value, the cleaning robot 1000 may identify a use of fibers laid on the fiber floor area as a carpet.

Accordingly, the cleaning robot 1000 may identify a use of a fiber floor area 110 having an area that is larger than or equal to the threshold area value, as a carpet. Also, the cleaning robot 1000 may identify a use of fiber floor areas 910, 920, 930, and 940 each having an area that is smaller than the threshold area value, as a rug or defecation pad.

Also, the cleaning robot 1000 may identify, as a rug, a use of the fiber floor areas 920, 930, and 940 located at a kitchen, at a dining room, or near a boundary between adjacent rooms among the fiber floor areas 910, 920, 930, and 940 each having an area that is smaller than the threshold area value, and the cleaning robot 1000 may identify a use of the fiber floor area 910 being in close contact with a wall surface of a hallway as a defecation pad.

Figure 11:
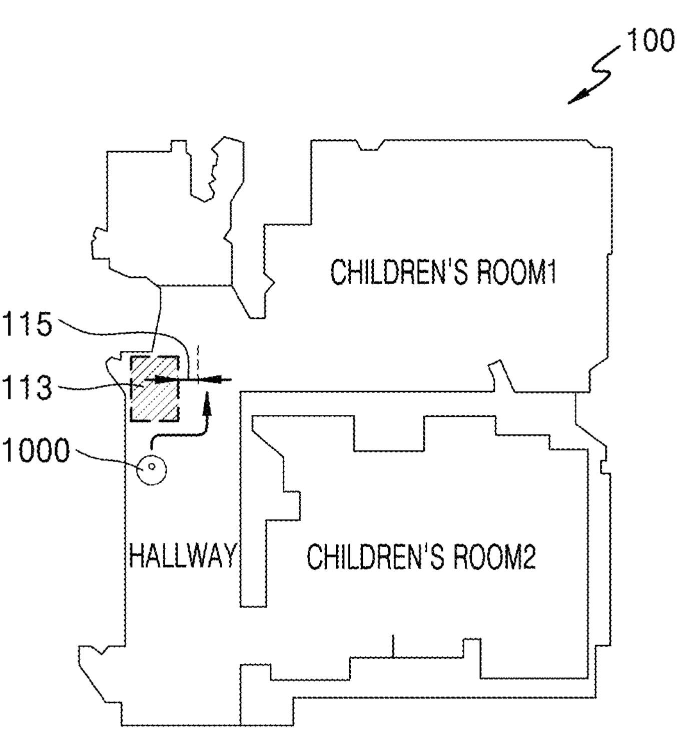
FIG. 11 shows a method by which a cleaning robot moves around while avoiding a defecation pad, according to an embodiment of the disclosure.

FIG. 11 shows a method by which the cleaning robot 1000 moves while avoiding a defecation pad, according to an embodiment of the disclosure.

Referring to FIG. 11, the cleaning robot 1000 may move at a preset distance from a defecation pad area.

According to identification of a detected fiber floor area as a defecation pad area, the cleaning robot 1000 may move at a preset distance from a boundary of the defecation pad area, thereby moving while avoiding the defecation pad area.

While the cleaning robot 1000 moves based on a pre-stored map 100, the cleaning robot 1000 may set a driving route along which the cleaning robot 1000 moves at a preset distance 115 from a boundary of a defecation pad area 113 on the map 100.

According to an embodiment of the disclosure, while the cleaning robot 1000 moves based on the pre-stored map 100, the cleaning robot 1000 may control an image sensor (for example, a RGB camera or a 3D camera) to identify whether a defecation pad exists at a location of an actual cleaning area corresponding to a location of the defecation pad area 113 on the map 100, and, according to identification that a defecation pad exists at the location of the actual cleaning area, the cleaning robot 1000 may set a driving route along which the cleaning robot 1000 moves at the preset distance 115 from the boundary of the defecation pad area 113.

According to an embodiment of the disclosure, while the cleaning robot 1000 moves based on the pre-stored map 100, the cleaning robot 1000 may delete the defecation pad area 113 from the map 100, according to identification that no defecation pad exists at the location of the actual cleaning area, corresponding to the location of the defecation pad area 113 on the map 100, and move while cleaning the defecation pad area 113 in the same way as in a normal cleaning area.

Figure 12:
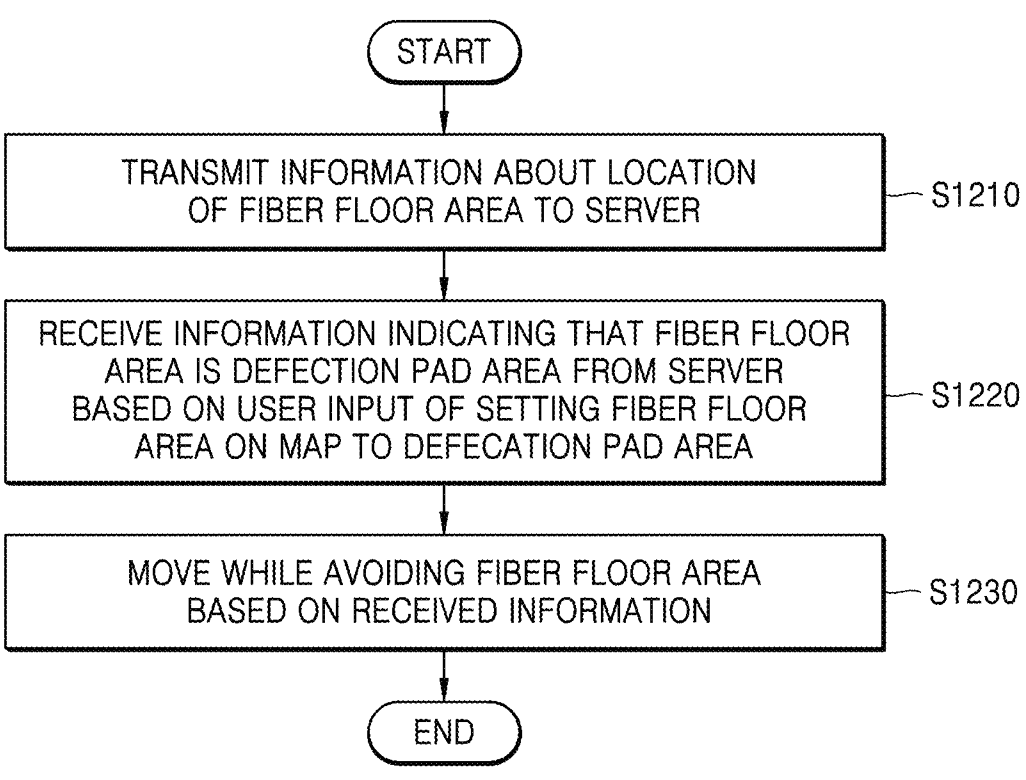
FIG. 12 is a flowchart illustrating a method by which a cleaning robot avoids a defecation pad area based on a user input of setting a fibrous floor area to the defecation pad area, according to an embodiment of the disclosure.

FIG. 12 is a flowchart illustrating a method by which the cleaning robot 1000 avoids a defecation pad area based on a user input of setting a fiber floor area to the defecation pad area, according to an embodiment of the disclosure.

In operation S1210, the cleaning robot 1000 may transmit information about a location of a fiber floor area to a server.

According to an embodiment of the disclosure, the cleaning robot 1000 may transmit, based on identification of a fiber floor area, identification information of the cleaning robot 1000 and location information of the fiber floor area on a map, to the server.

According to an embodiment of the disclosure, the cleaning robot 1000 may transmit, based on identification that the identified fiber floor area is a defecation pad, location information of the fiber floor area identified as the defecation pad on the map to the server. The cleaning robot 1000 may transmit the identification information of the cleaning robot 1000 and the location information of the fiber floor area on the map to the server.

According to an embodiment of the disclosure, based on a detection of a new defecation pad from an area not being a defecation pad on a pre-stored map while the cleaning robot 1000 moves with reference to the map, the cleaning robot 1000 may transmit information about a location of a fiber floor area on the map to the server.

According to an embodiment of the disclosure, the cleaning robot 1000 may transmit, to the server, image information obtained by photographing the fiber floor area, together with the information about the location of the fiber floor area on the map.

According to identification that the identified fiber floor area is a defecation pad, the cleaning robot 1000 may move while avoiding the identified fiber floor area.

In operation S1220, the cleaning robot 1000 may receive information indicating that the fiber floor area is a defecation pad area, from the server, based on a user input of setting the fiber floor area on the map to the defecation pad area.

The server may transmit, to the user device 2000 corresponding to the identification information of the cleaning robot 1000, the location information of the fiber floor area on the map and information representing a confirmation request about whether the fiber floor area is a defecation pad area.

In an embodiment of the disclosure, according to reception of the location information of the fiber floor area on the map from the cleaning robot 1000, the server may transmit the information representing the confirmation request as push notification information to the user device 2000.

The user device 2000 may display a map on which the fiber floor area is displayed based on the location information of the fiber floor area on the map, and display a user interface of inquiring about whether to set the displayed fiber floor area to a defecation pad area.

According to an embodiment of the disclosure, the user device 2000 may display a push notification for confirming a defecation pad area, and according to reception of a user input of selecting the push notification, the user device 2000 may display a map on which the fiber floor area is displayed, and display a user interface of inquiring about whether to set the displayed fiber floor area to a defecation pad area.

According to an embodiment of the disclosure, the user device 2000 may display image information obtained by photographing the fiber floor area, together with the map on which the fiber floor area is displayed.

Based on a user input of setting the fiber floor area displayed on the map to a defecation pad area, the cleaning robot 1000 may transmit a user account and information indicating that the fiber floor area is a defecation pad area to the server. The server may transmit map information indicating that the fiber floor area is a defecation pad area, to the cleaning robot 1000 corresponding to the user account.

Based on a user input of selecting that the fiber floor area displayed on the map is not a defecation pad area, the cleaning robot 1000 may transmit a user account and information indicating that the fiber floor area is not a defecation pad area to the server. The server may transmit map information indicating that the fiber floor area is not a defecation pad area to the cleaning robot 1000 corresponding to the user account.

Based on a user input of selecting that the fiber floor area displayed on the map is a rug or carpet, the cleaning robot 1000 may transmit a user account and information indicating that the fiber floor area is a rug or carpet to the server. The server may transmit map information indicating that the fiber floor area is a rug or carpet to the cleaning robot 1000 corresponding to the user account.

In operation S1230, the cleaning robot 1000 may move while avoiding the fiber floor area, based on the received information.

Based on reception of map information indicating that a fiber floor area is set to a defecation pad area, the cleaning robot may continue to move without returning to the detected fiber floor area.

Based on reception of map information indicating that a fiber floor area is not a defecation pad area while the cleaning robot 1000 moves, the cleaning robot 1000 may identify that the fiber floor area is not a defecation pad, and return to the fiber floor area to clean the fiber floor area.

Also, the cleaning robot 1000 may store the map information indicating that the fiber floor area is not a defecation pad, and according to a detection of a fiber floor area at the same area upon next driving, the cleaning robot 1000 may identify that the fiber floor area is not a defecation pad.

Also, based on reception of map information indicating that a fiber floor area is a rug or carpet, the cleaning robot 1000 may identify, according to a detection of a fiber floor area at the same area upon next driving, that the fiber floor area is a rug or carpet.

Figure 13:
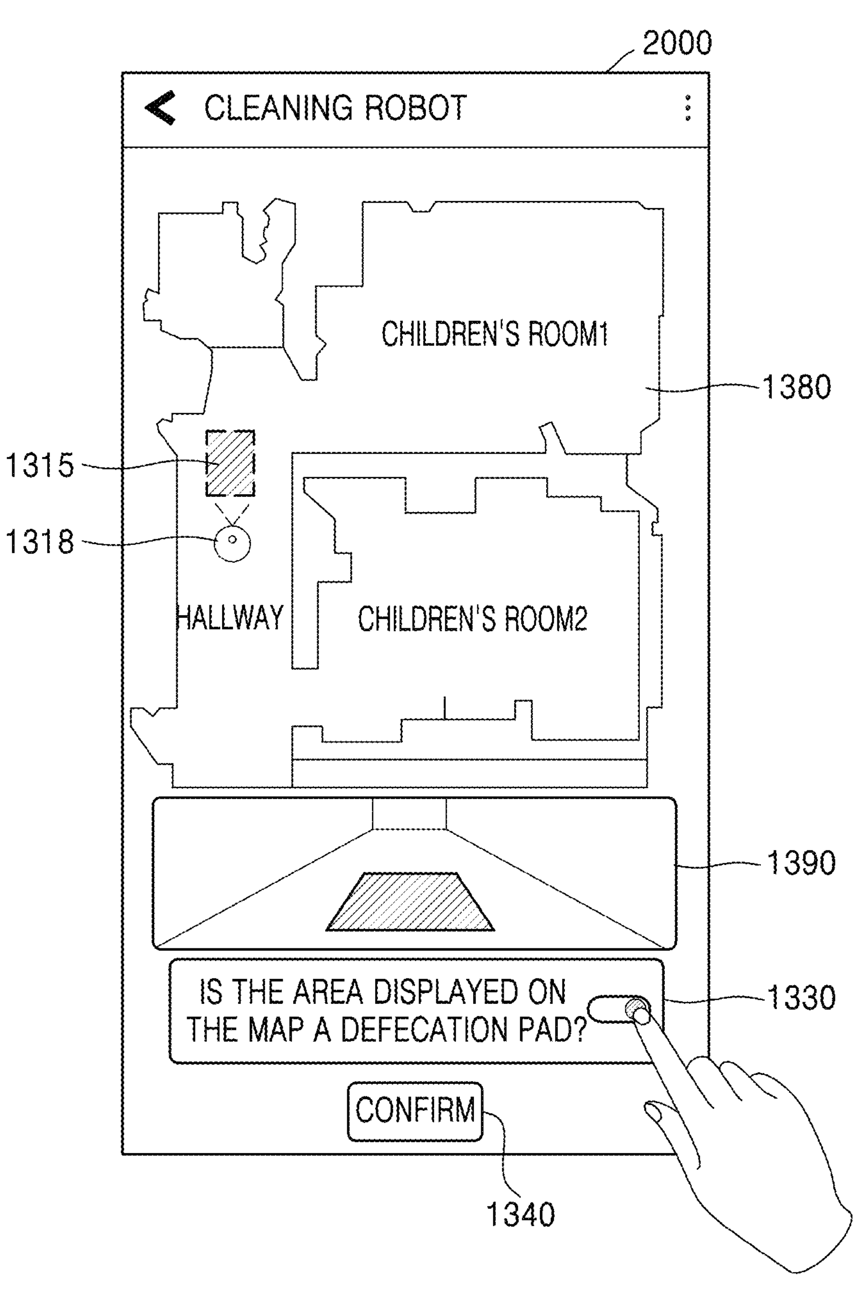
FIG. 13 shows a user interface for determining whether a fibrous floor area detected by a cleaning robot is a defecation pad area based on a user's confirmation, according to an embodiment of the disclosure.

FIG. 13 shows a user interface for determining whether a fiber floor area detected by the cleaning robot 1000 is a defecation pad area based on a user's confirmation, according to an embodiment of the disclosure.

Referring to FIG. 13, based on location information of a fiber floor area on a map, received from a server, the user device 2000 may display a user interface for determining whether the fiber floor area is a defecation pad area based on a user's confirmation.

Based on the location information of the fiber floor area on the map, received from the server, the user device 2000 may display a map image 1380 of a cleaning area and an image 1315 representing the fiber floor area on the map. According to an embodiment of the disclosure, the user device 2000 may display a photographed image 1390 of the fiber floor area and an image 1318 representing a direction and location of the cleaning robot 1000 upon photographing, received from the server.

Also, the user device 2000 may display a button interface 1330 for enabling a user to select whether the fiber floor area displayed on the map is a defecation pad area.

Based on reception of a user input of selecting that the fiber floor area displayed on the map is a defecation pad area and pressing a confirm button 1340, the user device 2000 may transmit information indicating that the fiber floor area is a defecation pad area to the server.

Based on reception of a user input of selecting that the fiber floor area displayed on the map is not a defecation pad area and pressing the confirm button 1340, the user device 2000 may transmit information indicating that the fiber floor area is not a defecation pad area to the server.

According to an embodiment of the disclosure, based on a user input of selecting that the fiber floor area displayed on the map is not a defecation pad area, the user device 2000 may display a user interface of inquiring about whether the fiber floor area displayed on the map is another object made of a fiber material. For example, the user device 2000 may display a user interface for enabling the user to select one among a carpet, a rug, clothes, a towel, or a paper.

Based on reception of information indicating that the fiber floor area is not a defecation pad area from the user device 2000, the server may transmit, to the cleaning robot 1000, map information indicating that the fiber floor area is not a defecation pad area. The cleaning robot 1000 may store the map information indicating that the fiber floor area is not a defecation pad area. Also, while the cleaning robot 1000 moves, the cleaning robot 1000 may return to the fiber floor area to clean the fiber floor area.

In an embodiment of the disclosure, according to reception of a kind of an object corresponding to the fiber floor area and selected by the user from the server while the cleaning robot 1000 moves, the cleaning robot 1000 may return to the fiber floor area to clean the fiber floor area, based on the kind of the object being a carpet, a rug, or a paper, and the cleaning robot 1000 may continue to move without returning to the fiber floor area based on the kind of the object being clothes or a towel.

According to an embodiment of the disclosure, the user device 2000 may display a user interface for enabling the user to set the fiber floor area displayed on the map to a no-entry area. Based on reception of information indicating that the fiber floor area is a no-entry area from the user device 2000, the server may transmit map information indicating that the fiber floor area is a no-entry area, to the cleaning robot 1000.

Figure 14:
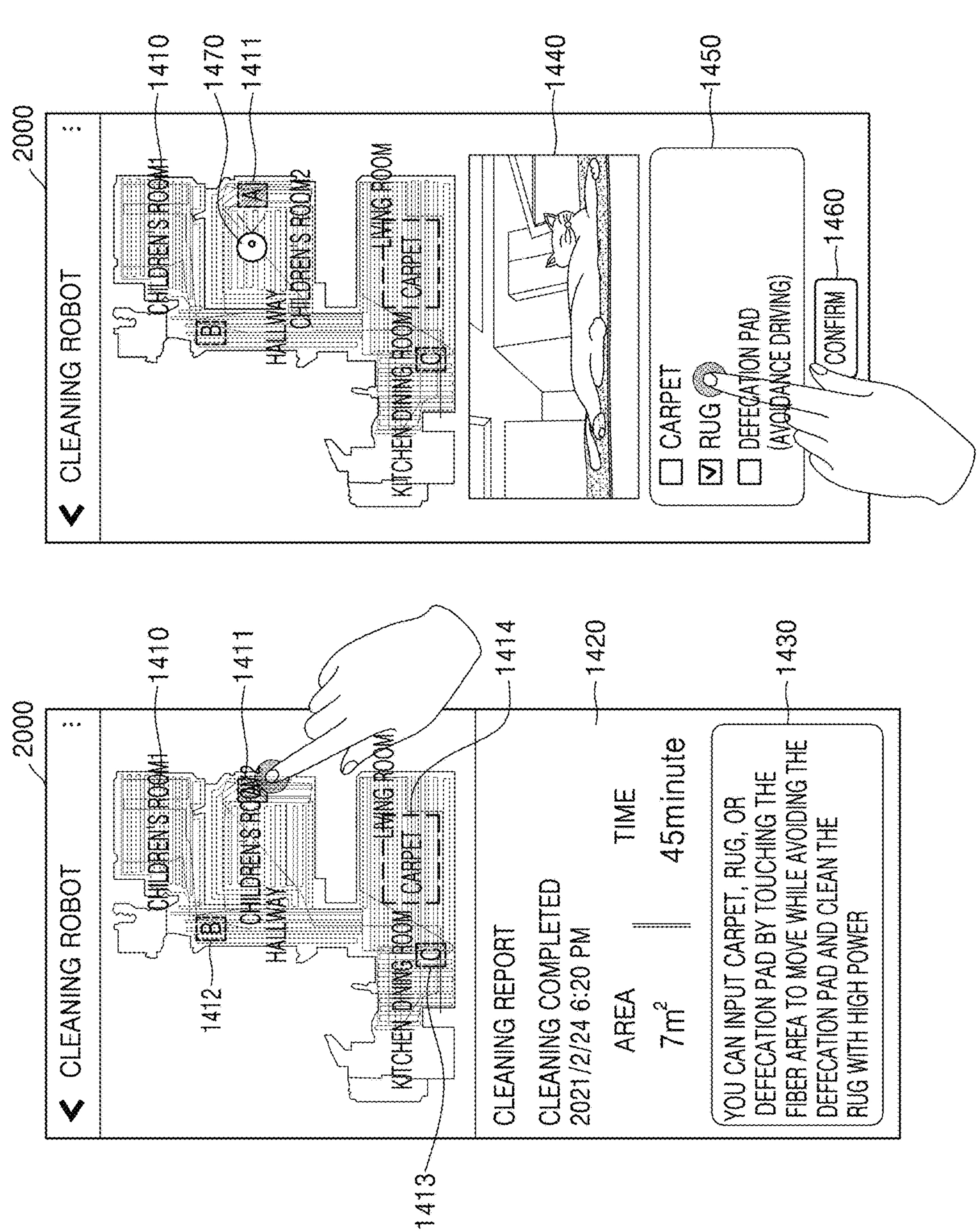
FIG. 14 shows a user interface for inputting a use of a fibrous floor area identified by a cleaning robot, according to an embodiment of the disclosure.

FIG. 14 shows a user interface for inputting a use of a fiber floor area identified by the cleaning robot 1000, according to an embodiment of the disclosure.

Referring to FIG. 14, after cleaning is completed, the user device 2000 may display a user interface for inputting uses of fiber floor areas based on location information of the fiber floor areas on a map, received from a server.

Referring to a left figure of FIG. 14, based on reception of a user input of selecting a menu for checking a cleaning report after cleaning is completed, the user device 2000 may display a map image 1410 of the cleaning area, and images 1411, 1412, 1413, and 1414 representing fiber floor areas on the map.

Also, the user device 2000 may display a notification text 1430 indicating that the user can input uses of the fiber floor areas by selecting the images 1411, 1412, 1413, and 1414 representing the fiber floor areas.

Based on reception of a user input of selecting an area on the map, the user device 2000 may display a user interface for enabling the user to select a kind of an object corresponding to the selected area.

For example, referring to a right figure of FIG. 14, based on reception of a user input of touching an A area 1411 on the map, the user device 2000 may display a user interface 1450 for enabling the user to select one from among a carpet, a rug, or a defecation pad, as a kind of an object corresponding to the A area 1411. Also, the user device 2000 may display an image indicating that the A area 1411 has been selected, on the A area 1411.

Also, the user device 2000 may display a photographed image 1440 of the A area 1411 and an image 1470 representing an angle and location of the cleaning robot 1000 upon photographing. The photographed image 1440 of the A area 1411 and the image 1470 representing the angle and location of the cleaning robot 1000 upon photographing may be received by the user device 2000 from the cleaning robot 1000 via the server.

Based on reception of a user input of selecting the rug in correspondence to the A area 1411 and pressing a confirm button 1460, the user device 2000 may transmit, to the server, identification information of the A area 1411 and information indicating that an object laid on the A area 1411 is a rug. The server may transmit map information indicating that an object laid on the A area 1411 is a rug, to the cleaning robot 1000. Upon next driving for cleaning, the cleaning robot 1000 may enter the A area 1411 based on the map information received from the server, and perform dry cleaning with an increased suction force while cleaning the A area 1411.

Also, based on reception of a user input of selecting the defecation pad in correspondence to the A area 1411 and pressing the confirm button 1460, the cleaning robot 1000 may move, upon next driving for cleaning, while avoiding the A area 1411.

Figure 15:
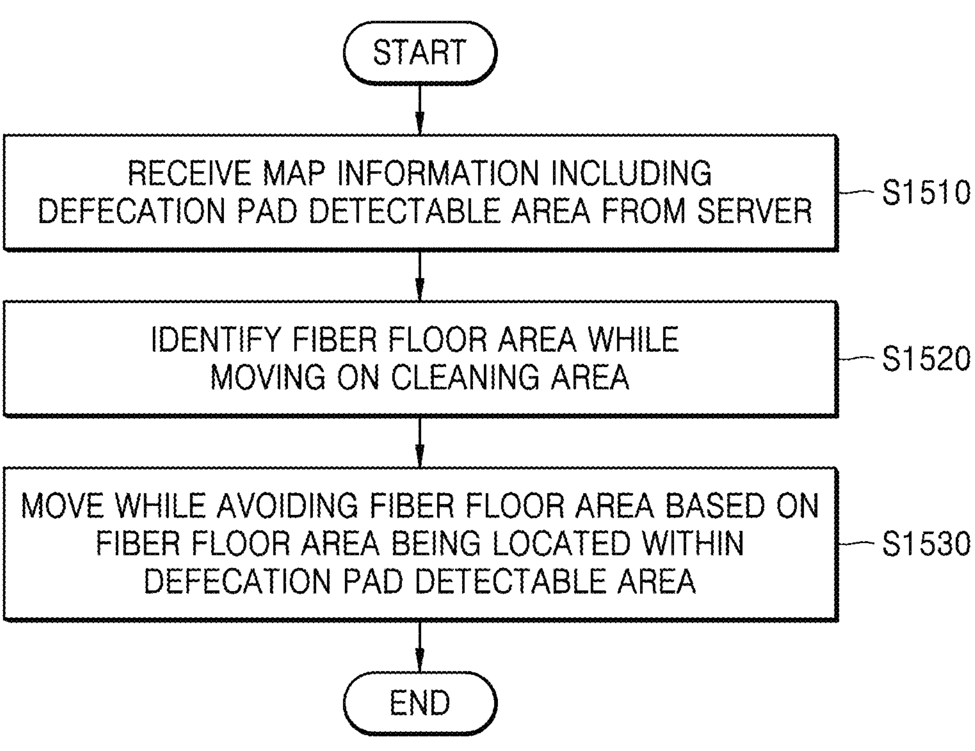
FIG. 15 is a flowchart illustrating a method by which a cleaning robot cleans a fibrous floor area based on a user input of setting a defecation pad detectable area, according to an embodiment of the disclosure.

FIG. 15 is a flowchart illustrating a method by which the cleaning robot 1000 cleans a fiber floor area based on a user input of setting a defecation pad detectable area, according to an embodiment of the disclosure.

In operation S1510, the cleaning robot 1000 may receive map information including a defecation pad detectable area from a server.

The user device 2000 may display a user interface for setting a defecation pad detectable area on a map. Based on reception of a user input of setting a defecation pad detectable area through the user interface, the user device 2000 may transmit identification information of the map and location information of the defecation pad detectable area to the server. The server may transmit the map information indicating the defecation pad detectable area to the cleaning robot 1000.

In operation S1520, the cleaning robot 1000 may identify a fiber floor area while moving on a cleaning area.

Operation S1520 may be described with reference to operation S310 of FIG. 3.

In operation S1530, the cleaning robot 1000 may move while avoiding the fiber floor area based on the fiber floor area being located within the defecation pad detectable area.

The cleaning robot 1000 may identify whether the fiber floor area is located within the defecation pad detectable area. Based on the fiber floor area being located within the defecation pad detectable area, the cleaning robot 1000 may identify the fiber floor area as a defecation pad area, and move while avoiding the fiber floor area.

According to an embodiment of the disclosure, although an entire of the fiber floor area is not located within the defecation pad detectable area, the cleaning robot 1000 may identify the fiber floor area as a defecation pad area according to a reference proportion of the fiber floor area being located within the defecation pad detectable area.

According to an embodiment of the disclosure, the cleaning robot 1000 may move while avoiding the defecation pad detectable area, regardless of whether the fiber floor area is located within the defecation pad detectable area. The cleaning robot 1000 may move at a preset distance from the defecation pad detectable area without cleaning the defecation pad detectable area.

According to an embodiment of the disclosure, based on reception of a user input of moving the cleaning robot 1000 to the defecation pad detectable area and then starting cleaning, the cleaning robot 1000 may stop the wet cleaning module and a dry cleaning module and pad-up the wet mop pad until the cleaning robot 1000 deviates a preset distance from the defecation pad detectable area.

Figure 16:
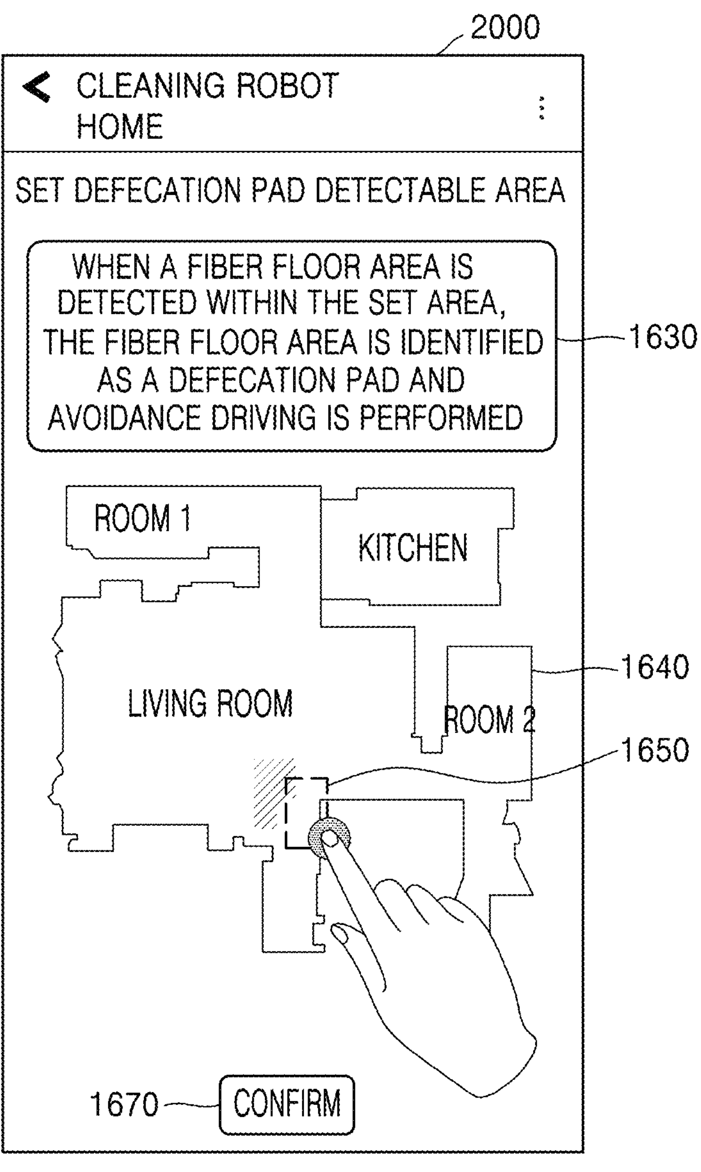
FIG. 16 shows a user interface for setting a defecation pad detectable area on a map, according to an embodiment of the disclosure.

FIG. 16 shows a user interface for setting a defecation pad detectable area on a map, according to an embodiment of the disclosure.

Referring to FIG. 16, based on reception of a user input of selecting a menu for setting a defecation pad detectable area on a map of a cleaning area, the user device 2000 may display a user interface for setting a defecation pad detectable area on the map.

The user device 2000 may receive a user input of setting a defecation pad detectable area 1650 on a map image 1640.

Also, the user device 2000 may display a notification text 1630 informing that, according to a detection of a fiber floor area within a set defecation pad detectable area, the fiber floor area will be identified as a defecation pad and avoidance driving will be performed.

According to reception of a user input of selecting a confirm button 1670 after setting the defecation pad detectable area 1650, the user device 2000 may transmit identification information of the map and location information of the set defecation pad detectable area 1650 to the cleaning robot 1000 via the server.

Figure 17:
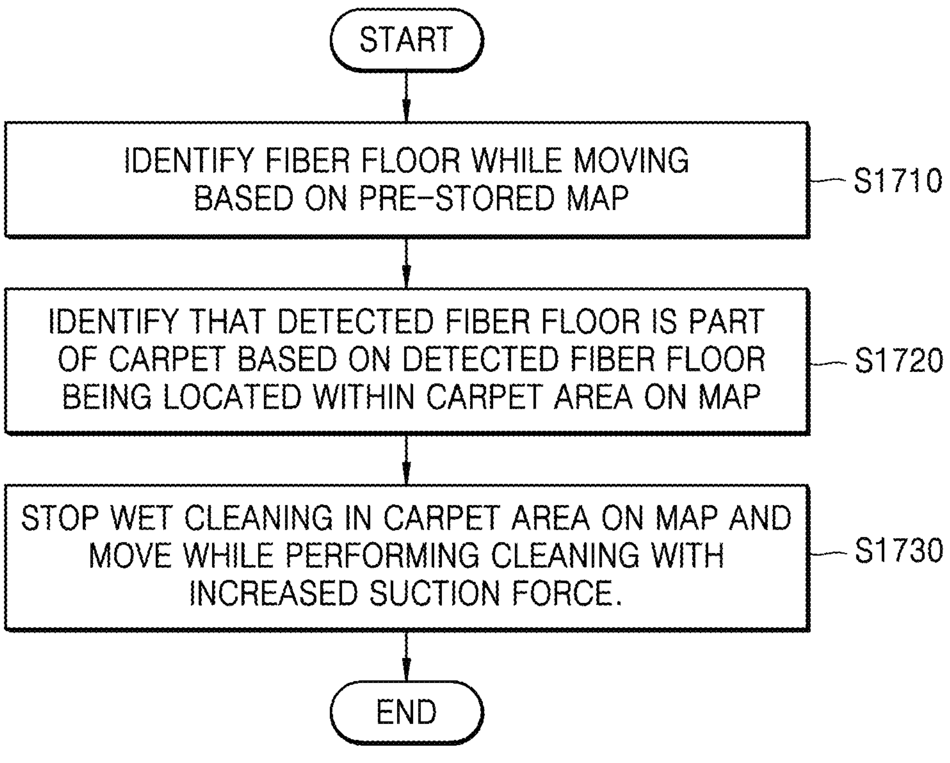
FIG. 17 is a flowchart illustrating a method by which a cleaning robot detects a fibrous floor area according to a driving mode, according to an embodiment of the disclosure.

FIG. 17 is a flowchart illustrating a method by which the cleaning robot 1000 detects a fiber floor area according to a driving mode, according to an embodiment of the disclosure.

In operation S1710, the cleaning robot 1000 may identify a fiber floor while moving based on a pre-stored map.

The cleaning robot 1000 may identify whether to detect a fiber floor area according to a driving mode.

According to an embodiment of the disclosure, the cleaning robot 1000 may operate in a driving mode for automatic cleaning or a driving mode for map drawing.

The driving mode for automatic cleaning may be a driving mode of performing cleaning while generating a map of a cleaning area. The driving mode for map drawing may include a driving mode of generating a map of a cleaning area without performing cleaning.

In the driving mode for automatic cleaning, the cleaning robot 1000 may update the pre-stored map while moving based on the map. Also, in the driving mode for automatic cleaning, according to identification that there is no pre-stored map or the pre-stored map does not match with a current cleaning area, the cleaning robot 1000 may move and perform cleaning while generating a new map.

The cleaning robot 1000 may detect a fiber floor while moving based on the pre-stored map.

In operation S1720, the cleaning robot 1000 may identify that the detected fiber floor is a part of a carpet based on the detected fiber floor being located within a carpet area on the map.

The cleaning robot 1000 may identify whether the detected fiber floor is located within the carpet area on the map. According to the detected fiber floor being located within the carpet area on the map, the cleaning robot 1000 may identify that the detected fiber floor is a part of a carpet without identifying a fiber floor area including the detected fiber floor.

The cleaning robot 1000 may efficiently identify whether a detected fiber floor is a part of a carpet based on the pre-stored map, without performing a process of identifying a fiber floor area whenever performing cleaning. Because a location of a carpet rarely changes in home, the carpet area may be quickly identified by using the pre-stored map.

According to an embodiment of the disclosure, in the driving mode for automatic cleaning, based on a detection of a fiber floor from at least a part of an actual area corresponding to the carpet area on the map while the cleaning robot 1000 moves based on the pre-stored map, the cleaning robot 1000 may identify that the detected fiber floor is a carpet without identifying a fiber floor area.

In operation S1730, the cleaning robot 1000 may stop wet cleaning in the carpet area on the map and move while performing cleaning with an increased suction force.

Based on identification that the detected fiber floor is a part of a carpet, the cleaning robot 1000 may stop wet cleaning in the carpet area of the pre-stored map and move while performing cleaning with an increased suction force. According to an embodiment of the disclosure, in the driving mode for automatic cleaning, in the case in which the cleaning robot 1000 identifies a defecation pad area on the map and a fiber floor area within a reference distance from the defecation pad area while the cleaning robot 1000 moves based on the pre-stored map, and a size of the identified fiber floor area is similar to a size of the defecation pad area on the map, the cleaning robot 1000 may identify the identified fiber floor area as a defecation pad.

According to an embodiment of the disclosure, in the driving mode for map drawing, because the cleaning robot 1000 generates a new map without referring to the pre-stored map, the cleaning robot 1000 may start a process of identifying a fiber floor area based on a detection of a fiber floor.

Figure 18:
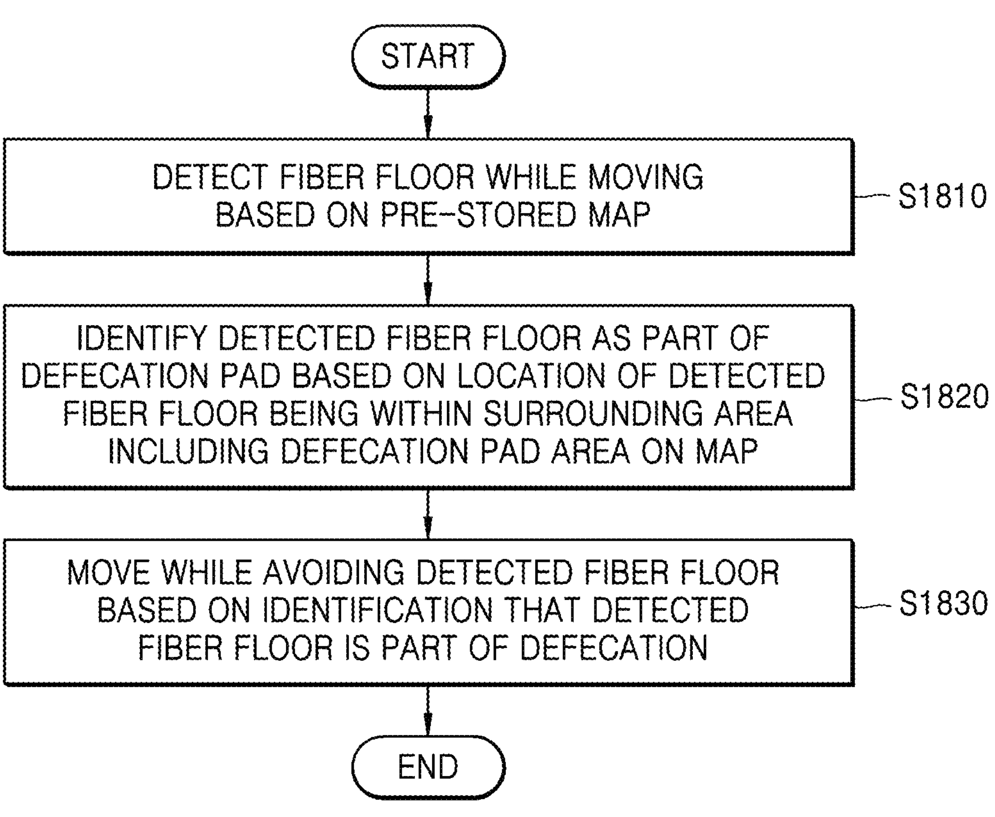
FIG. 18 is a flowchart illustrating a method by which a cleaning robot avoids a defecation pad with reference to a defecation pad area on a map, according to an embodiment of the disclosure.

FIG. 18 is a flowchart illustrating a method by which the cleaning robot 1000 avoids a defecation pad with reference to a defecation pad area on a map, according to an embodiment of the disclosure.

In operation S1810, the cleaning robot 1000 may detect a fiber floor while moving based on a pre-stored map.

The cleaning robot 1000 may detect the fiber floor while moving along a driving route based on the pre-stored map.

In operation S1820, based on a location of the detected fiber floor being within a surrounding area including a defecation pad area on the map, the cleaning robot 1000 may identify the detected fiber floor as a part of a defecation pad.

According to the detection of the fiber floor, the cleaning robot 1000 may identify whether a location of the detected fiber floor is within a surrounding area including a defecation pad area on the map.

The surrounding area may be an area surrounding the defecation pad area on the map. The surrounding area may include the defecation pad area. For example, the surrounding area may be an area obtained by increasing the defecation pad area by a preset multiple from a center of the defecation pad area.

Also, the surrounding area may include a defecation pad detectable area (1650 of FIG. 16) set by a user, as shown in FIG. 16.

Based on identification that the location of the detected fiber floor is within the surrounding area, the cleaning robot 1000 may identify that the detected fiber floor is a part of a defecation pad.

In operation S1830, based on identification that the detected fiber floor is a part of a defecation pad, the cleaning robot 1000 may move while avoiding the detected fiber floor.

Based on identification that the fiber floor is a part of a defecation pad, the cleaning robot 1000 may move while avoiding the detected fiber floor without identifying a fiber floor area. For example, according to identification that the fiber floor is a part of a defecation pad, the cleaning robot 1000 may move while avoiding the detected fiber floor and the defecation pad area on the map, without performing a process of identifying a fiber floor area.

After the cleaning robot 1000 avoids the defecation pad area, the cleaning robot 1000 may again move along the driving route.

Accordingly, after a size and location of a defecation pad are identified and stored as map information, the cleaning robot 1000 may avoid the defecation pad without again identifying an area of the defecation pad even when the defecation pad moves nearby.

Figure 19A:
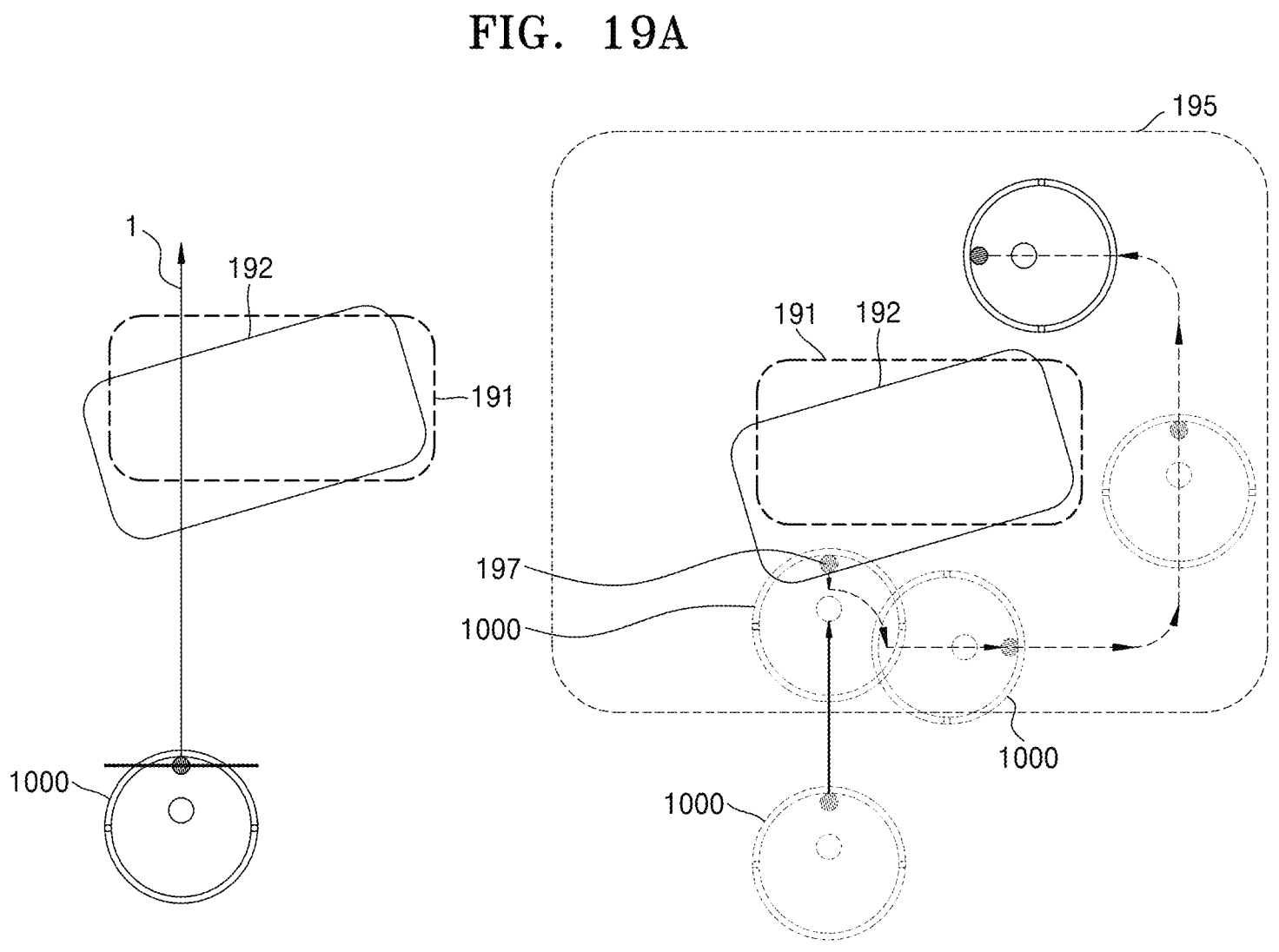
Figure 19B:
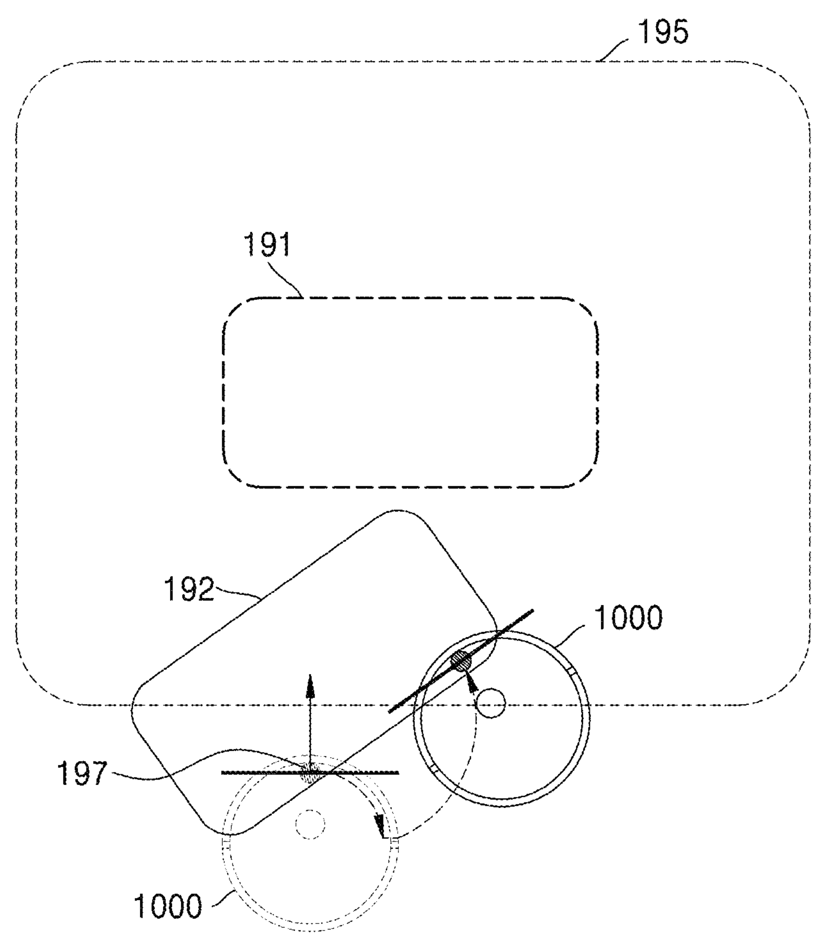

FIGS. 19A and 19B show a method by which the cleaning robot 1000 avoids a defecation pad with reference to a defecation pad area on a map, according to various embodiments of the disclosure.

Referring to FIG. 19A, according to a detection of a fiber floor within a surrounding area of a defecation pad while the cleaning robot 1000 moves, the cleaning robot 1000 may identify the detected fiber floor as a part of the defecation pad, and move while avoiding the detected fiber floor.

Referring to a left figure of FIG. 19A, the cleaning robot 1000 may move along a driving route 1 based on a pre-stored map. The map may include a defecation pad area 191. The defecation pad area 191 on the map may include an area where a defecation pad has been detected by the cleaning robot 1000 during previous driving. The cleaning robot 1000 may identify the driving route 1 crossing the defecation pad area 191 on the map.

According to a movement of the defecation pad after the defecation pad area 191 is identified and stored as map information, an actual defection pad area 192 may be different from the defecation pad area 191 on the map.

Referring to a right figure of FIG. 19A, based on a detection of a fiber floor 197 and a location of the detected fiber floor 197 being within a surrounding area 195 while the cleaning robot 1000 moves along the driving route 1, the cleaning robot 1000 may identify the detected fiber floor 197 as a part of a defecation pad.

Based on identification that the detected fiber floor 197 is a part of a defecation pad, the cleaning robot 1000 may move while avoiding the detected fiber floor 197 without performing a process of identifying a fiber floor area according to a preset pattern.

For example, the cleaning robot 1000 may reverse and then move while avoiding the detected fiber floor 197 and the defecation pad area 191 on the map.

Referring to FIG. 19B, based on identification that the location of the detected fiber floor is far from the defecation pad area, the cleaning robot 1000 may start a process of identifying a fiber floor area according to the preset pattern.

Based on identification that the location of the detected fiber floor deviates from the surrounding area 195, the cleaning robot 1000 may identify a fiber floor area 192 including the detected fiber floor 197 according to the preset driving pattern.

Also, the cleaning robot 1000 may identify whether the identified fiber floor area 192 is a defecation pad area, based on a location and size of the identified fiber floor area 192.

Figure 20:
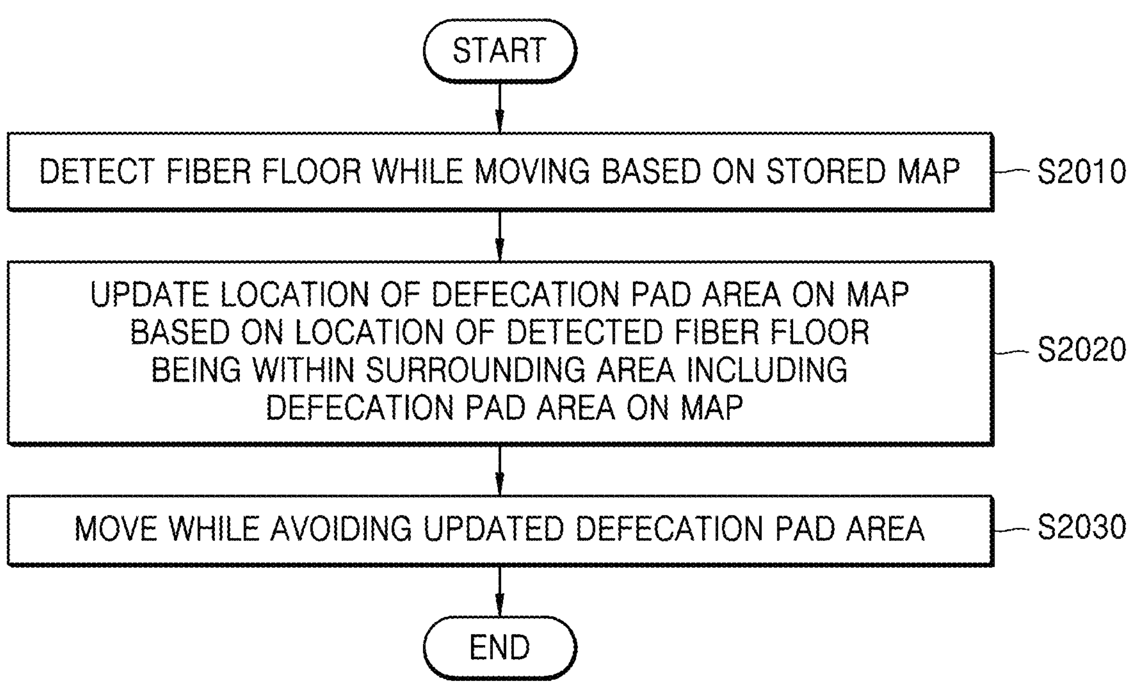
FIG. 20 is a flowchart illustrating a method by which a cleaning robot avoids a defecation pad with reference to a defecation pad area on a map, according to an embodiment of the disclosure.

FIG. 20 is a flowchart illustrating a method by which the cleaning robot 1000 avoids a defecation pad with reference to a defecation pad area on a map, according to an embodiment of the disclosure.

In operation S2010, the cleaning robot 1000 may detect a fiber floor while moving based on a stored map.

The cleaning robot 1000 may detect the fiber floor while moving along a driving route based on the stored map.

In operation S2020, based on a location of the detected fiber floor being within a surrounding area including a defecation pad area on the map, the cleaning robot 1000 may update a location of the defecation pad area on the map.

According to the detection of the fiber floor, the cleaning robot 1000 may identify whether the location of the detected fiber floor is within the surrounding area including the defecation pad area on the map.

The surrounding area may be a surrounding area surrounding the defecation pad area on the map. Also, the surrounding area may include the defecation pad area.

Based on identification that the location of the detected fiber floor is within the surrounding area, the cleaning robot 1000 may identify the detected fiber floor as a part of a defecation pad.

Also, based on identification that the location of the detected fiber floor is within the surrounding area, the cleaning robot 1000 may update the defecation pad area on the map. For example, the cleaning robot 1000 may update the defecation pad area by moving the defecation pad area on the map such that the detected fiber floor is included in the defecation pad area. Also, the cleaning robot 1000 may identify the moved defecation pad area as a defecation pad update area.

According to an embodiment of the disclosure, the cleaning robot 1000 may update the defecation pad area only upon a movement of a defecation pad.

For example, based on identification that the location of the detected fiber floor is within the surrounding area, the cleaning robot 1000 may identify whether the location of the detected fiber floor is within an edge range of the defecation pad area on the map.

The edge range of the defecation pad area may be an area that is within a preset distance from edges of the defection pad area. The preset distance may be, for example, 2 cm, although not limited thereto.

Based on identification that the location of the detected fiber floor deviates from the edge range of the defecation pad area on the map, the cleaning robot 1000 may identify that a defecation pad laid on the defection pad area on the map has moved, and update the defecation pad area on the map based on the location of the detected fiber floor.

Based on identification that the location of the detected fiber floor is within the edge range of the defecation pad area on the map, the cleaning robot 1000 may not update the defecation pad area on the map.

In operation S2030, the cleaning robot 1000 may move while avoiding the updated defecation pad area.

The cleaning robot 1000 may avoid the defecation pad based on a location of the defecation pad update area.

According to arrival at the driving route after the cleaning robot 1000 avoids the defecation pad, the cleaning robot 1000 may again move along the driving route. Also, according to the arrival at the driving route, the cleaning robot 1000 may store the defecation pad update area as a defecation pad area.

Accordingly, although a defecation pad detected during previous driving has moved nearby, the cleaning robot 1000 may identify an area of the moved defecation pad by using a location and size of the defecation pad area on the pre-stored map, without performing a process of identifying a defecation pad area by using the preset pattern.

Figure 21:
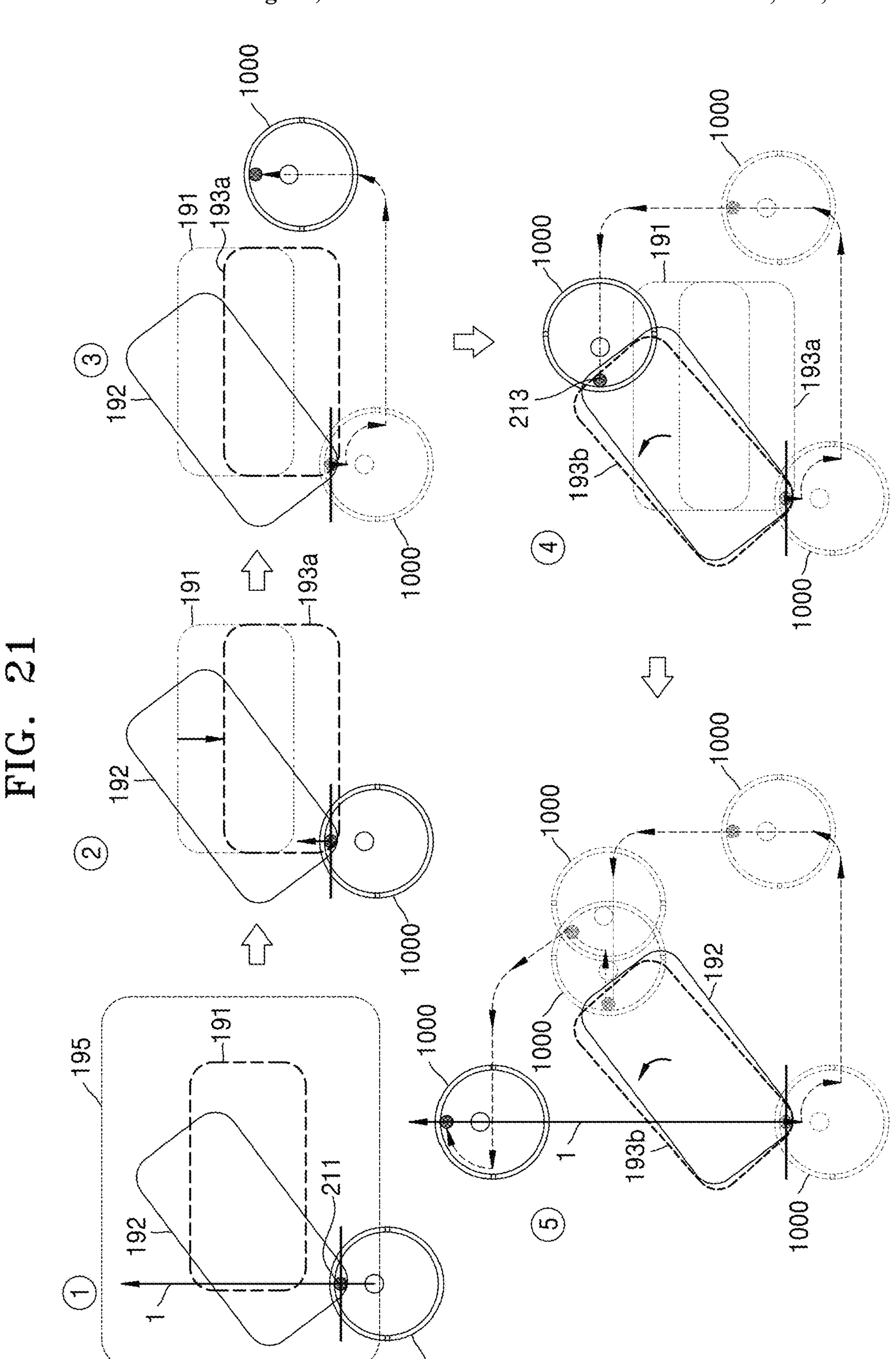
FIG. 21 shows a method by which a cleaning robot avoids a defecation pad with reference to a defecation pad area on a map, according to an embodiment of the disclosure.

FIG. 21 shows a method by which the cleaning robot 1000 avoids a defecation pad with reference to a defecation pad area on a map, according to an embodiment of the disclosure.

Referring to FIG. 21, although a defecation pad has moved, the cleaning robot 1000 may update a location of a defecation pad area by using a location and size of the defection pad area on a pre-stored map.

Referring to FIG. ① of FIG. 21, the cleaning robot 1000 may detect a fiber floor 211 while moving along a driving route 1. Based on a detection of the fiber floor 211, the cleaning robot 1000 may identify whether the detected fiber floor 211 is located within a surrounding area 195 on the map.

The surrounding area 195 may be an area surrounding a defecation pad area 191 on the map. The surrounding area 195 may include the defecation pad area 191. The defecation pad area 191 on the map may be an area where a defection pad has been identified during previous driving. As shown in FIG. 21, according to a movement of the defecation pad laid on the defecation pad area 191, an actual defecation pad area 192 may be different from the defecation pad area 191 on the map.

Referring to FIG. ② of FIG. 21, based on the detected fiber floor 211 being located within the surrounding area 195 on the map, the cleaning robot 1000 may move a location of the defecation pad area 191 downward such that the detected fiber floor 211 is included in the defecation pad area 191. In this case, the cleaning robot 1000 may move the location of the defecation pad area 191 such that the detected fiber floor 211 is included in the defecation pad area 191 and a movement distance of the defecation pad area 191 is minimized. The cleaning robot 1000 may set the moved location of the defecation pad area 191 to a first defecation pad update area 193*a*. Also, the cleaning robot 1000 may again set a surrounding area based on the first defecation pad update area 193*a*.

Referring to FIG. ③ of FIG. 21, the cleaning robot 1000 may move while avoiding the first defecation pad update area 193*a*. For example, the cleaning robot 1000 may reverse and then move at a preset distance from the first defecation pad update area 193*a* toward the driving route 1.

Referring to FIG. ④ of FIG. 21, while the cleaning robot 1000 moves while avoiding the first defecation pad update area 193*a*, the cleaning robot 1000 may again detect a fiber floor 213. The cleaning robot 1000 may move the defecation pad area 191 such that both the detected fiber floors 211 and 213 are included in the defecation pad area 191 and a movement distance of the defecation pad area 191 is minimized. The cleaning robot 1000 may set the moved location of the defecation pad area 191 to a second defecation pad update area 193*b*.

Referring to a FIG. ⑤ of FIG. 21, the cleaning robot 1000 may move while avoiding the second defecation pad update area 193*b*. For example, the cleaning robot 1000 may reverse and then move at a preset distance from the second defecation pad update area 193*b* toward the driving route 1. Based on arrival at the driving route 1, the cleaning robot 1000 may store the second defecation pad update area 193*b* as a defecation pad area.

FIG. 22 is a block diagram of the cleaning robot 1000 according to an embodiment of the disclosure.

Referring to FIG. 22, the cleaning robot 1000 may include the processor 1100, a microphone 1200, a communication module 1300, the memory 1400, an input interface 1500, an output module 1600, a sensor 1700, the driving module 1800, and a cleaning module 1900. The same components as those shown in FIG. 2 are assigned like reference numerals.

All the shown components may not be essential components of the cleaning robot 1000. The cleaning robot 1000 may be configured with more components than those shown in FIG. 22 or with less components than those shown in FIG. 22.

The processor 1100 may control overall operations of the cleaning robot 1000. The processor 1100 may execute at least one instruction or programs stored in the memory 1400 to control the microphone 1200, the communication module 1300, the input interface 1500, the output module 1600, the sensor 1700, the driving module 1800, and the cleaning module 1900.

The processor 1100 may include a neural processing unit (NPU) for performing operations of a machine-learning model. Also, the processor 1100 may include a central processing unit (CPU), a graphic processing unit (GPU), etc.

The memory 1400 may store various information, data, instructions, programs, etc. required for operations of the cleaning robot 1000. The memory 1400 may include at least one of volatile memory or non-volatile memory, or a combination thereof. The memory 1400 may include at least one type of storage medium among a flash memory type, a hard disk type, a multimedia card micro type, card type memory (for example, Secure Digital (SD) memory or extreme Digital (XD) memory), random access memory (RAM), static random access memory (SRAM), read-only memory (ROM), electrically erasable programmable read-only memory (EEPROM), programmable read-only memory (PROM), magnetic memory, a magnetic disk, or an optical disk. Also, the cleaning robot 1000 may manage a web storage or a cloud server that performs a storage function on the Internet.

At least one processor 1100 and at least one memory 1400 may be included in a controller. For example, at least one processor 1100 and at least one memory 1400 may be included in a micro controller unit (MCU).

The communication module 1300 may transmit/receive information to/from an external apparatus or an external server according to a protocol under a control by the processor 1100. The communication module 1300 may include at least one communication module and at least one port that transmits/receives data to/from an external apparatus (not shown).

Also, the communication module 1300 may perform communication with an external apparatus through at least one wired or wireless communication network. The communication module 1300 may include at least one of a short-range communication module 1310 or a long-distance communication module 1320 or a combination thereof. The communication module 1300 may include at least one antenna for communicating with another apparatus in a wireless manner.

The short-range communication module 1310 may include at least one communication module (not shown) that performs communication according to communication standards, such as Bluetooth, Wireless Fidelity (Wi-Fi), Bluetooth Low Energy (BLE), Near Field Communication/Radio Frequency Identification (NFC/RFID), Wi-fi Direct, ultra-wideband (UWB), or ZIGBEE. Also, the long-distance communication module 1320 may include a communication module (not shown) that performs communication through a network for internet communication. Also, the long-distance communication module 1320 may include a mobile communication module that performs communication according to communication standards, such as 3rd Generation (3G), 4th Generation (4G), 5th Generation (5G), and/or 6th Generation (6G).

Also, the communication module 1300 may include a communication module capable of receiving a control command from a remote controller (not shown) located within a short distance, for example, an infrared (IR) communication module.

The output module 1600 may include a sound output module 1620 and a display 1610.

The sound output module 1620 may output a sound signal to outside of the cleaning robot 1000. The sound output module 1620 may include, for example, a speaker or a receiver. The speaker may be used for general purposes, such as multimedia playback or recording playback.

The display 1610 may output image data subject to image-processing by an image processor (not shown) through a display panel (not shown), according to a control by the processor 1100. The display panel (not shown) may include at least one of a liquid crystal display, a thin film transistor-liquid crystal display, an organic light-emitting diode, a flexible display, a three-dimensional (3D) display, or an electrophoretic display.

The input interface 1500 may receive a user input for controlling the cleaning robot 1000. The input interface 1500 may receive the user input and transfer the user input to the processor 1100.

The input interface 1500 may include a user input electronic device including a touch panel that detects a user's touch, a button that receives a user's push operation, a wheel that receives a user's rotation operation, a keyboard, and a dome switch, although not limited thereto.

Also, the input interface 1500 may include a voice recognition device for voice recognition. For example, the voice recognition device may be the microphone 1200, and the voice recognition device may receive a user's voice command or a user's voice request. Accordingly, the processor 1100 may perform a control of performing an operation corresponding to a voice command or a voice request.

The cleaning module 1900 may include a dry cleaning module 1910 and a wet cleaning module 1920. The dry cleaning module 1910 may include a brush, a dust collector, a dust separator, and a suction motor. The wet cleaning module 1920 may include a mop pad, a mop pad motor, a mop pad up-down module, a water container, and a water supply motor.

The suction motor (also, referred to as a vacuum motor) may intake air into an inlet of the cleaning robot 1000 by rotating a fan (not shown) connected to the suction motor. The suction motor may include a Direct Current (DC) suction motor, a Brushless Direct Current (BLDC) suction motor, a dry suction motor, and a wet suction motor, although not limited thereto.

The brush may be a bristle brush with a plurality of bristles or a winceyette brush with winceyette, although not limited thereto. The brush may rotate by a driving force transferred from a brush motor (not shown). The brush may sweep away dust or foreign materials scattered on a floor and move the dust or foreign materials to the inlet (not shown) of the cleaning robot 1000.

The dust container may store dust sucked into the inlet (not shown) of the cleaning robot 1000 and then filtered out by the dust separator (not shown).

The mop pad motor may perform mopping by rotating the mop pad attached to the cleaning robot 1000. The mop pad up-down device module may perform a pad-up operation of causing the mop pad in close contact with a floor to be in close contact with the cleaning robot 1000 or a pad-down operation of causing the mop pad in close contact with the cleaning robot 1000 to be in close contact with the floor.

The sensor 1700 may include various kinds of sensors.

The sensor 1700 may include the floor detection sensor 1710, a position sensor 1720, an obstacle detection sensor 1730, an object recognition sensor 1740, and a fall prevention sensor 1750.

The floor detection sensor 1710 may be described with reference to FIG. 2.

The position sensor 1720 may include a Time-of-Flight (TOF) LiDAR sensor. The TOF LiDAR sensor may include an output device that outputs a laser pulse signal, and a receiver that receives a reflection signal of the output laser pulse signal. The processor 1100 may control the TOF LiDAR sensor to identify a distance from the cleaning robot 1000 to an object around the cleaning robot 1000, or locations of objects on a map.

The obstacle detection sensor 1730 may output infrared light or ultrasonic waves, and receive a reflection signal reflected from an obstacle. The processor 1100 may control the obstacle detection sensor 1730 to detect whether there is an obstacle ahead.

The object recognition sensor 1740 may include a 2D camera sensor and a 3D camera sensor. The object recognition sensor 1740 may photograph a front view of the cleaning robot 1000 and identify kinds and locations of objects in a photographed image.

The fall prevention sensor 1750 may include an infrared emitter (not shown) and an infrared receiver (not shown) positioned toward a floor. The processor 1100 may control the infrared emitter (not shown) of the fall prevention sensor 1750 to output infrared light toward the floor, and control the infrared receiver (not shown) to receive a reflection signal reflected from the floor. The processor 1100 may detect a distance from the cleaning robot 1000 to the floor based on the received reflection signal. For example, the processor 1100 may detect an amount of infrared light reflected from the floor and detect a distance from the cleaning robot 1000 to the floor based on the detected amount of infrared light. Also, the processor 1100 may identify whether there is a risk of a fall or a level difference based on the distance to the floor.

The at least one processor 1100 may identify a fiber floor area through the floor detection sensor 1710 while moving on a cleaning area.

The at least one processor 1100 may identify whether the fiber floor area is a defecation pad area, based on at least one of a size of the fiber floor area or a location of the fiber floor area on a map of the cleaning area.

According to identification that the fiber floor area is a defecation pad area, the at least one processor 1100 may control the driving module 1800 to move while avoiding the fiber floor area.

Based on identification that the fiber floor area is not a defection pad area while the at least one processor 1100 controls the dry cleaning module 1910 and the wet cleaning module 1920 to perform wet cleaning together with dry cleaning, the at least one processor 1100 may stop the wet cleaning module 1920 and control only the dry cleaning module 1910 within the fiber floor area to perform cleaning.

Based on the size of the fiber floor area being smaller than a reference pad size and the location of the fiber floor area being within a preset location range on the map, the at least one processor 1100 may identify that the fiber floor area is a defecation pad area. Also, the at least one processor 1100 may control the driving module 1800 to move while avoiding the fiber floor area.

Based on the size of the fiber floor area being smaller than the reference pad size and the location of the fiber floor area not being near a boundary between rooms on the map, the at least one processor 1100 may identify that the fiber floor area is a defecation pad area.

Based on the size of the fiber floor area exceeding the reference pad size, the at least one processor 1100 may identify that a carpet is laid on the fiber floor area.

Based on the size of the fiber floor area being smaller than or equal to the reference pad size and the location of the fiber floor area being near a boundary between rooms on the map, the at least one processor 1100 may identify that a rug is laid on the fiber floor area.

Based on the size of the fiber floor area being smaller than or equal to the reference pad size and the location of the fiber floor area being near an end of a hallway or a corner of a wall surface in the map, the at least one processor 1100 may identify that a defecation pad is laid on the fiber floor area.

The at least one processor 1100 may transmit information about the location of the fiber floor area to the server through the communication module 1300. Also, the at least one processor 1100 may receive, based on a user input of setting a fiber floor area on the map to a defecation pad area, information indicating that the fiber floor area is a defecation pad area from the server through the communication module 1300. Based on the reception of the information indicating that the fiber floor area is a defecation pad area, the at least one processor 1100 may identify the fiber floor area as a defecation pad area.

The at least one processor 1100 may receive, based on a user input of setting a certain area of the cleaning area on the map of the cleaning area to a defecation pad detectable area, map information including the defecation pad detectable area from the server through the communication module 1300. Also, based on a fiber floor area being located within the defecation pad detectable area, the at least one processor 1100 may identify the fiber floor area as a defecation pad area.

According to a detection of a floor made of a fiber material through the floor detection sensor 1710, the at least one processor 1100 may detect a plurality of surrounding locations at which the floor made of the fiber material is detected, based on a preset driving pattern. Also, the at least one processor 1100 may identify a fiber floor area based on the plurality of surrounding locations.

Based on a size of the fiber floor area being larger than a reference pad size, the at least one processor 1100 may identify that the fiber floor area is not a defecation pad area.

Based on a location of the fiber floor area being a wall surface or a corner of a wall surface, the at least one processor 1100 may identify that the fiber floor area is a defecation pad area.

A machine-readable storage media may be provided in the form of non-transitory storage media. Herein, 'non-transitory storage media' means that the storage media do not include a signal (for example, electromagnetic waves) and are tangible, without meaning that data is semi-permanently or temporarily stored in the storage media. For example, 'non-transitory storage media' may include a buffer in which data is temporarily stored.

According to an embodiment of the disclosure, the method according to various embodiments disclosed in the present document may be included in a computer program product and provided. The computer program product may be traded between a seller and a purchaser as a commodity. The computer program product may be distributed in the form of a machine-readable storage media (for example, compact disc read only memory (CD-ROM)), or be distributed (for example, downloaded or uploaded) online via an application store or between two user devices (for example, smart phones) directly. When distributed online, at least part of the computer program product (for example, downloadable app) may be temporarily generated or at least temporarily stored in the machine-readable storage media, such as memory of the manufacturer's server, a server of the application store, or a relay server.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A cleaning robot comprising:

a driving circuit;

a floor detection sensor;

memory storing one or more computer programs; and one or more processors communicatively coupled to the driving circuit, the floor detection sensor, and the memory, wherein the one or more computer programs include computer-executable instructions that, when executed by the one or more processors individually or collectively, cause the cleaning robot to:

identify a fibrous floor area through the floor detection sensor while the cleaning robot moves around on a cleaning area, determine whether the fibrous floor area is a defecation pad area based on a size of the fibrous floor area being smaller than a reference pad size and a location of the fibrous floor area being within a preset location range on a map of the cleaning area, and control, based on an identification that the fibrous floor area is the defecation pad area, the driving circuit to cause the cleaning robot to move around while avoiding the fibrous floor area.

2. The cleaning robot of claim 1, wherein the one or more computer programs further include computer-executable instructions that, when executed by the one or more processors individually or collectively, cause the cleaning robot to:

store map information indicating that the fibrous floor area is the defecation pad area, and cause, based on a detection of a fibrous floor within a surrounding area including the defecation pad area while the cleaning robot moves around based on the map information, the cleaning robot to move around while avoiding the detected fibrous floor.

3. The cleaning robot of claim 1, wherein the one or more computer programs further include computer-executable instructions that, when executed by the one or more processors individually or collectively, cause the cleaning robot to:

determine, based on the size of the fibrous floor area being smaller than the reference pad size and the location of the fibrous floor area not being near a boundary between rooms in the map, that the fibrous floor area is the defecation pad area.

4. The cleaning robot of claim 3, wherein the one or more computer programs further include computer-executable instructions that, when executed by the one or more processors individually or collectively, cause the cleaning robot to:

determine, based on the size of the fibrous floor area exceeding the reference pad size, that a carpet is laid on the fibrous floor area, determine, based on the size of the fibrous floor area being smaller than or equal to the reference pad size and the location of the fibrous floor area being near the boundary between rooms in the map, that a rug is laid on the fibrous floor area, and determine, based on the size of the fibrous floor area being smaller than or equal to the reference pad size and the location of the fibrous floor area being near an end of a hallway or a corner of a wall surface in the map, that a defecation pad is laid on the fibrous floor area.

5. The cleaning robot of claim 1, wherein the one or more computer programs further include computer-executable instructions that, when executed by the one or more processors individually or collectively, cause the cleaning robot to:

transmit information about the location of the fibrous floor area to a server, receive, based on a user input of setting the fibrous floor area on the map to a defecation pad area, information indicating that the fibrous floor area is the defecation pad area from the server, and determine that the fibrous floor area is the defecation pad area.

6. The cleaning robot of claim 5, wherein the one or more computer programs further include computer-executable instructions that, when executed by the one or more processors individually or collectively, cause the cleaning robot to:

receive, based on a user input of setting a part of the cleaning area on the map of the cleaning area to a defecation pad detectable area, map information including the defecation pad detectable area from the server, and determine, based on the fibrous floor area being located within the defecation pad detectable area, that the fibrous floor area is the defecation pad area.

7. The cleaning robot of claim 1, wherein the one or more computer programs further include computer-executable instructions that, when executed by the one or more processors individually or collectively, cause the cleaning robot to:

detect, according to a detection of a floor made of a fibrous material through the floor detection sensor, a plurality of floors made of a fibrous material around the fibrous floor area based on a preset driving pattern, and identify the fibrous floor area based on locations of the plurality of floors made of the fibrous material.

8. The cleaning robot of claim 1, wherein the one or more computer programs further include computer-executable instructions that, when executed by the one or more processors individually or collectively, cause the cleaning robot to:

identify, based on the fibrous floor area being located close to a wall, the wall as an edge of the fibrous floor area.

9. The cleaning robot of claim 1, wherein the one or more computer programs further include computer-executable instructions that, when executed by the one or more processors individually or collectively, cause the cleaning robot to:

determine, according to the location of the fibrous floor area being a wall surface or a corner of a wall surface, that the fibrous floor area is the defecation pad area, and cause the cleaning robot to move around while avoiding the defecation pad area.

10. A method performed by a cleaning robot for detecting a floor while moving around, the method comprising:

identifying, by the cleaning robot, a fibrous floor area while moving around on a cleaning area;

determining, by the cleaning robot, based on a size of the fibrous floor area being smaller than a reference pad size and a location of the fibrous floor area being within a preset location range on a map of the cleaning area, whether the fibrous floor area is a defecation pad area; and causing, by the cleaning robot, based on determining that the fibrous floor area is the defecation pad area, the cleaning robot to move around while avoiding the fibrous floor area.

11. The method of claim 10, further comprising:

storing map information indicating that the fibrous floor area is the defecation pad area; and causing, based on a detection of a fibrous floor within a surrounding area including the defecation pad area while the cleaning robot moves around based on the map information, the cleaning robot to move around while avoiding the detected fibrous floor.

12. The method of claim 10, wherein the identifying of whether the fibrous floor area is the defecation pad area comprises:

determining, based on the size of the fibrous floor area being smaller than the reference pad size and the location of the fibrous floor area not being near a boundary between rooms in the map, that the fibrous floor area is the defecation pad area.

13. The method of claim 12, further comprising:

determining, based on the size of the fibrous floor area exceeding the reference pad size, that a carpet is laid on the fibrous floor area;

determining, based on the size of the fibrous floor area being smaller than or equal to the reference pad size and the location of the fibrous floor area being near the boundary between rooms in the map, that a rug is laid on the fibrous floor area; and determining, based on the size of the fibrous floor area being smaller than or equal to the reference pad size and the location of the fibrous floor area being near an end of a hallway or a corner of a wall surface in the map, that a defecation pad is laid on the fibrous floor area.

14. The method of claim 10, wherein the identifying of whether the fibrous floor area is the defecation pad area comprises:

transmitting information about the location of the fibrous floor area to a server;

receiving, based on a user input of setting the fibrous floor area on the map to the defecation pad area, information indicating that the fibrous floor area is the defecation pad area from the server; and determining that the fibrous floor area is the defecation pad area, based on the received information.

15. The method of claim 14, wherein the identifying of whether the fibrous floor area is the defecation pad area comprises:

receiving, based on a user input of setting a part of the cleaning area on the map of the cleaning area to a defecation pad detectable area, map information including the defecation pad detectable area from the server; and determining, based on the fibrous floor area being located within the defecation pad detectable area, that the fibrous floor area is the defecation pad area.

16. The method of claim 10, wherein the identifying of the fibrous floor area while the cleaning robot moves around on the cleaning area comprises:

detecting, according to a detection of a floor made of a fibrous material through a floor detection sensor, a plurality of floors made of a fibrous material around the fibrous floor area based on a preset driving pattern; and identifying the fibrous floor area based on locations of the plurality of floors made of the fibrous material.

17. The method of claim 10, wherein the identifying of whether the fibrous floor area is the defecation pad area comprises:

identifying, based on the fibrous floor area being close to a wall, the wall as an edge of the fibrous floor area.

18. The method of claim 10, wherein the identifying of whether the fibrous floor area is the defecation pad area comprises:

determining, according to the location of the fibrous floor area being a wall surface or a corner of a wall surface, the fibrous floor area as the defecation pad area.

* * * * *